US012572205B2

(12) United States Patent
Daltorio et al.

(10) Patent No.: US 12,572,205 B2
(45) Date of Patent: Mar. 10, 2026

(54) USER INTERFACE DEVICE FOR ROBOTS, ROBOT SYSTEMS AND RELATED METHODS

(71) Applicant: CASE WESTERN RESERVE UNIVERSITY, Cleveland, OH (US)

(72) Inventors: Kathryn Daltorio, Shaker Heights, OH (US); Jianfeng Zhou, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 0 days.

(21) Appl. No.: 18/635,585

(22) Filed: Apr. 15, 2024

(65) Prior Publication Data

US 2024/0345660 A1 Oct. 17, 2024

Related U.S. Application Data

(60) Provisional application No. 63/496,288, filed on Apr. 14, 2023.

(51) Int. Cl.
G06F 3/01 (2006.01)
G05D 1/223 (2024.01)
(Continued)

(52) U.S. Cl.
CPC .............. G06F 3/014 (2013.01); G05D 1/223 (2024.01); G05D 1/224 (2024.01);
(Continued)

(58) Field of Classification Search
CPC ........ G06F 3/014; G05D 1/223; G05D 1/224; G05D 2109/12; G05D 2111/30; G05D 2111/50
See application file for complete search history.

(56) References Cited

U.S. PATENT DOCUMENTS

2002/0021277 A1* 2/2002 Kramer ................... G06F 3/016
345/156
2010/0234182 A1* 9/2010 Hoffman ................. A61F 5/013
482/8

(Continued)

OTHER PUBLICATIONS

Kurisu, Masamitsu, Proceedings of the 2011 IEEE, Beijing China, Aug. 7-10.

(Continued)

*Primary Examiner* — Towfiq Elahi
(74) *Attorney, Agent, or Firm* — Tarolli, Sundheim, Covell & Tummino LLP

(57) ABSTRACT

A wearable human-machine interface device includes a base, a finger, a sensor, and an interface controller. The finger extends longitudinally from the base and including first and second rigid finger segments. A proximal end of the first finger segment is coupled to the base, and a proximal end of the second finger segment is coupled to a distal end of the first finger segment by a joint. The joint is adapted to enable rotational movement of the second finger segment relative to the first finger segment. The sensor is coupled to the finger and configured to provide a sensor signal representative of a position and/or movement of the second finger segment relative to the first finger segment. An interface controller is configured to provide a control signal representative of a flexion of the finger and/or a position of a fingertip of the finger based on the sensor signal.

16 Claims, 15 Drawing Sheets

(51) Int. Cl.

| | | |
|---|---|---|
| *G05D 1/224* | (2024.01) | |
| *G05D 109/12* | (2024.01) | |
| *G05D 111/30* | (2024.01) | |
| *G05D 111/50* | (2024.01) | |

(52) U.S. Cl.
CPC ...... *G05D 2109/12* (2024.01); *G05D 2111/30* (2024.01); *G05D 2111/50* (2024.01)

(56) References Cited

U.S. PATENT DOCUMENTS

| | | | | |
|---|---|---|---|---|
| 2018/0000501 A1* | 1/2018 | Baym | .................... | A61B 34/32 |
| 2020/0323657 A1* | 10/2020 | Pande | .................. | A61H 1/0285 |
| 2023/0286139 A1* | 9/2023 | Yoshikawa | ............ | B25J 9/1607 |
| 2024/0248488 A1* | 7/2024 | Chi | .......................... | G05D 1/60 |

OTHER PUBLICATIONS

Liu, Jianguo, et al. An Interactive Astronaut-Robot System with Gesture Control, Computational Intelligence and Neuroscience, vol. 2016, pp. 1-11.

Popescu, Dorin, et al., Development of Robotic Glove for Hand Rehabilitation Post-Stroke, 20th International Conference on Control Systems and Science, 2015.

Gu, Xiaochi, et al., Dexmo: An Inexpensive and Lightweight Mechanical Exoskeleton for Motion Capture and Force Feedback in VR, CHI, 2016, pp. 1991-1995.

Mae, Yasushi, et al., Direct Teleoperation System of Multi-limbed Robot for Moving on Complicated Environments, 2017 IEEE, pp. 1-4.

Roy, Kathika, et al., Flex sensor based wearable gloves for Robotic gripper control, AIR, 2015, Gao, India, pp. 1-5.

Qi, Jing, et al., Fusing Hand Postures and Speech Recognition for Tasks Performed by an Integrated Leg-Arm Hexapod Robot, Appt. Sci. 2020, 10, 6995, pp. 1-26.

Chen, Sunjie, et al. Hand Gesture Based Robot Control System Using Leap Motion, ICIRA 2015, Part 1, LNAI 9244, 581-591, 2015.

Hoshino, Keiya, et al., Improvement of operability of tele-operation system for legged rescue robot, IEEE, Shenyang, China, Aug. 24-27, 2018.

Glauser, Oliver, et al., Interactive Hand Pose Estimation using a Stretch-Sensing Soft Glove, ACM Trans. Graph, vol. 38, No. 4, Article 41, Jul. 2019.

Huang, Kevin, et al. Telelocomotion—Remotely Operated Legged Robots, Appl. Sci. 2021, 11, 194, pp. 1-20.

* cited by examiner

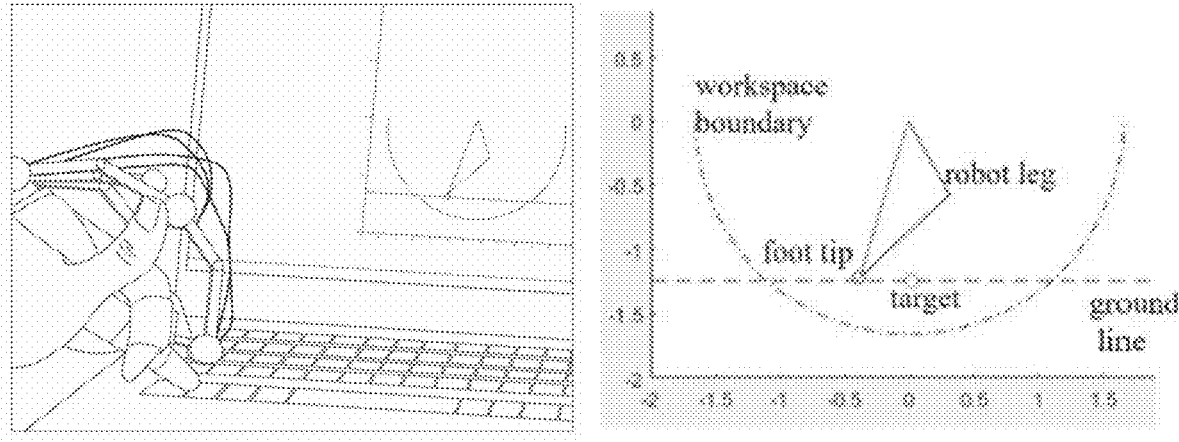
FIG. 14A                    FIG. 14B
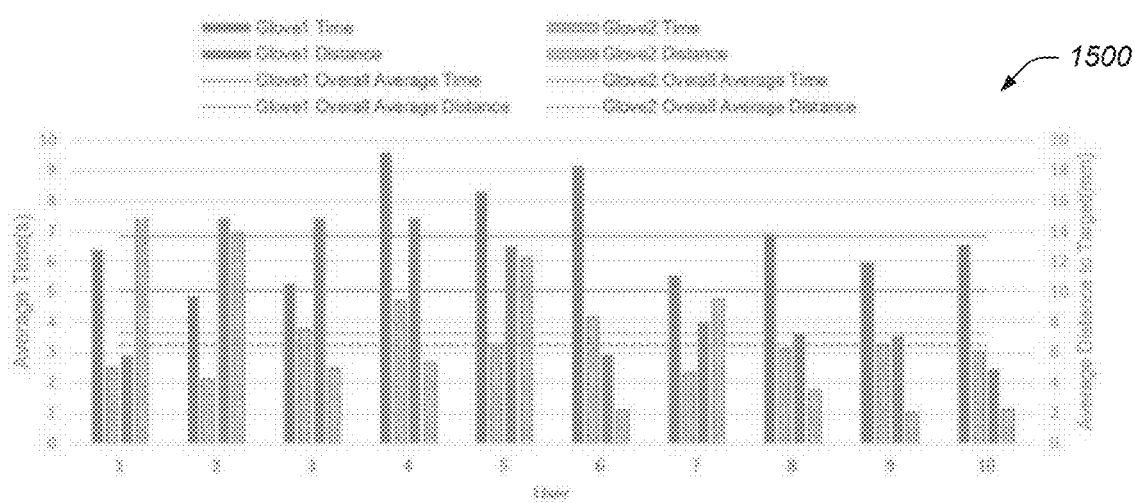
FIG. 15

USER INTERFACE DEVICE FOR ROBOTS, ROBOT SYSTEMS AND RELATED METHODS

CROSS-REFERENCE TO RELATED APPLICATION

This application claims the benefit of priority to U.S. Provisional Patent Application No. 63/496,288, filed Apr. 14, 2023, which is incorporated herein by reference in its entirety.

GOVERNMENT FUNDING

This invention was made with government support under N00014-19-1-2138 awarded by the Office of Naval Research and W912HQ-19-P0052 awarded by Strategic Environmental Research and Development Project (DOD/EPA). The government has certain rights in the invention.

TECHNICAL FIELD

This disclosure relates to robotics and, more particularly, to a user interface device for controlling robots as well as to robotic systems and related methods.

BACKGROUND

Many robots are designed for use in environments that are too dangerous or remote for human workers. However, the more complex and dangerous the task is, the more likely human oversight will be needed to handle unexpected situations. Thus, while many legged robots are ideal mechanically for mobility on irregular terrain, controlling legs with autonomous gaits can limit the adaptability potential of these robots. While autonomous gaits are improving due to artificial intelligence and bio-inspiration sometimes the human operator needs to intervene, a process which can be challenging and tedious. For example, if the human operator is an expert in a particular environment, direct teleoperation may be needed if the human can recognize obstacles better than the robot can. However, without an intuitive user interface, it can be annoying to control each joint and individual leg motions particularly for walking over long distances.

SUMMARY

This disclosure relates to robotics and, more particularly, to a user interface device for controlling robots as well as to robotic systems and related methods.

In one example, a wearable human-machine interface device includes a base and a finger extending longitudinally from the base and including first and second finger segments. A proximal end of the first finger segment is coupled to the base. A proximal end of the second finger segment is coupled to a distal end of the first finger segment by a joint. The joint is adapted to enable movement of the second finger segment relative to the first finger segment. A sensor is coupled to the finger and configured to provide a sensor signal representative of a position and/or movement of the second finger segment relative to the first finger segment. An interface controller is configured to provide a control signal representative of a flexion of the finger and/or a position of a distal tip of the finger based on the sensor signal.

In a further example, a robot system includes the interface and a locomotive robot coupled to the interface device through a communications link. The robot includes a body and a limb extending from the body. An actuator is coupled to the limb and configured to move the limb relative to the body to cause locomotion of the robot on or through a medium. A robot controller is configured to control the actuator to move the limb based on the control signal, which is received through the communications link.

In another example, a robot system includes an interface device adapted to be attached to and/or worn by a user to measure motion of one or more fingers of the user, in which the interface device is configured to map the measured motion to control motion of at least one leg of a legged robot. For example, the mapping can be unidirectional from the measured motion to control the motion of the robot or bidirectional with a first mapping direction from the measured motion to control the motion of the robot and a second mapping direction from at least one sensor of the robot to the interface device. The interface device can use the signals via the second mapping to provide user-perceptible feedback the user.

In another example, a method of controlling a robot includes measuring, by an interface device, motion of one or more fingers of a user to provide measured motion data representative of the measured motion and/or position of the one or more fingers. The method also includes mapping the measured motion to control instructions to command motion of one or more legs of a robot. The method also includes controlling motion of the one or more legs of the robot based on the control instructions.

BRIEF DESCRIPTION OF THE DRAWINGS

FIGS. 14A-14B illustrate an operator controlling a simulated robot leg to reach a target position on the simulated ground and an example simulation environment.

FIG. 15 illustrates the results of an interaction efficiency test.

DESCRIPTION

Figure 1:
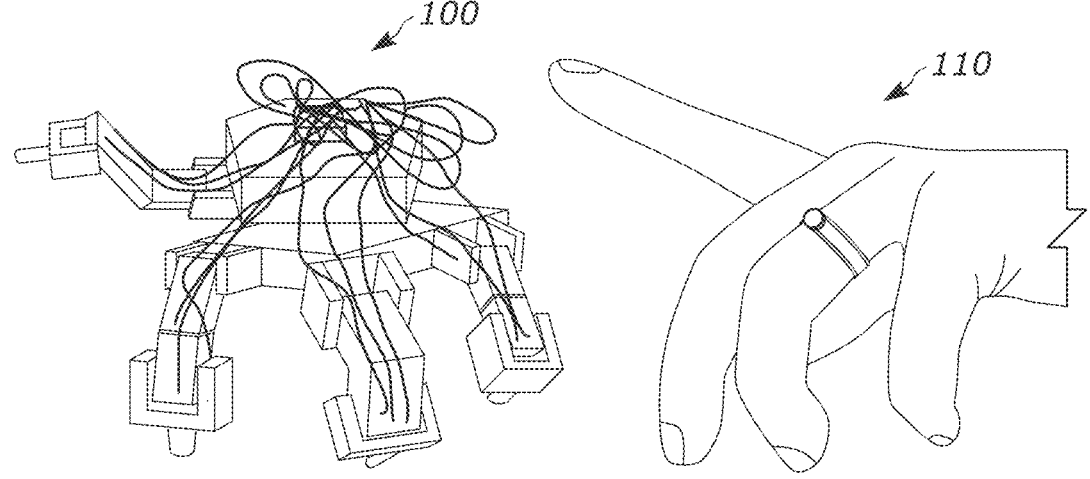
FIG. 1 illustrates an example of a hexapod robot (left) and human hand (right).

This disclosure relates to robotics and, more particularly, to a user interface device for controlling robots. For example, the user interface can be configured to specify leg placement for a walking claw or other robot having articulated limbs (e.g., legs) based on sensed finger motions.

As an example, a wearable human-machine interface (HMI) device can include a base, a finger, a sensor, and an interface controller. The HMI device can be adapted to be attached to (e.g., worn on) a hand or other extremity (e.g., foot) of a user. The finger of the HMI device extends longitudinally from the base between proximal and distal ends of the finger. In an example, the finger includes first and second finger segments. A proximal end of the first finger segment is coupled to the base by a joint that allow movement of the first finger segment relative to the base. The base-to-first finger segment joint can be adapted to enable rotational movement, abduction and/or adduction of the finger segment relative to the base. A proximal end of the second finger segment is coupled to a distal end of the first finger segment by a joint. The joint is adapted to enable rotational movement of the second finger segment relative to the first finger segment. The sensor is coupled to the finger and configured to provide a sensor signal representative of a position and/or movement of the second finger segment relative to the first finger segment. In some examples, each joint can include one or more sensors configured to provide respective sensor signals based on the relative position and/or movement of the structural elements connected by each respective joint. The interface controller is configured to provide a control signal representative of a flexion of the finger and/or a position of a fingertip of the finger based on the sensor signal(s). As described herein, the control signal can be used to control robot locomotion (e.g., terrestrial or aquatic environments) or other tasks (e.g., grasping, attaching to structures, moving objects etc.).

In another example, a robot system includes a device worn by a user (e.g., a glove or other user interface device that can be attached to the user's hand). The device is configured to measure motion of one more fingers of the user. The device is also configured to map the measured motion of the user's hand to control motion of one or more legs of a legged robot. As used herein, a leg refers to a limb of the robot that is adapted to provide for locomotion of the robot. Also, or alternatively, one or more legs of the robot further ca be adapted to support weight of the robot. A leg thus can define a loadbearing limb of the robot, which can complicate controlling motion thereof. The device can also be configured to map the measured motion of the user's hand to control other types of robot locomotion (e.g., terrestrial or aquatic environments) and/or other tasks (e.g., grasping, attaching to structures, moving objects etc.), which can depend on the mapping. The mapping can be unidirectional from the measured motion to control the robot. Alternatively, unidirectional mapping can be from one or more sensors of the robot back to the device and used by the device to provide feedback for the user. As a further example, the mapping can be bidirectional, including mapping from the measured motion at the control device to control the robot and mapping from sensors of the robot back to the control device and used to provide user feedback at the device (or another remote station). For example, the feedback to the user can include haptic resistance, two-dimensional force feedback, three-dimensional force feedback, a vibration, sounds, buzz, visual guidance (e.g., on a display or illuminating lights) or other user feedback. The wearable control device can signal commands to the robot (e.g., over a wired or wireless link) based on motions made with a single finger or with multiple fingers, which can be combined with motions sensed by joysticks or other input devices to control robot locomotion (e.g., terrestrial or aquatic environments) or other tasks (e.g., grasping, attaching to structures, moving objects etc.).

As another example, the control interface of the wearable interface is configured to implement Joint Angle Mapping (JAM). In an additional, or alternative example, the control interface is configured to implement Tip Position Mapping (TPM), which can be more efficient. For example, a manual controlled gait based on TPM is an effective method in adjusting step size to avoid obstacles. In high obstacle density environments, TPM reduces the number of contacts compared to fixed gaits, which can be an improvement over some of the autonomous gaits with longer step size. This shows that TPM has potential in environments and situations where autonomous footfall planning fails or is unavailable.

In some examples, a hybrid control scheme can be implemented (e.g., in a controller) in which the manual and autonomous controls are integrated together to perform walking and/or other functions.

The devices and methods described herein are useful for controlling legged robots having articulated limbs (also referred to herein as legs), such as hexapod robots. While for sake of consistency and ease of explanation, the devices and methods are disclosed for use with hexapod robot, the control interface devices and methods are equally applicable to control other types of legged robots. For example, a robot system includes a legged robot and a device worn by a user to map between finger motions of the user and robot motions.

FIG. 1 illustrates an example of a hexapod robot 100 and human hand 110. Thus, as described herein and as shown in FIG. 1, similarities between a hexapod robot and a human hand can be leveraged to implement the user interface devices and related control methods.

Figure 2:
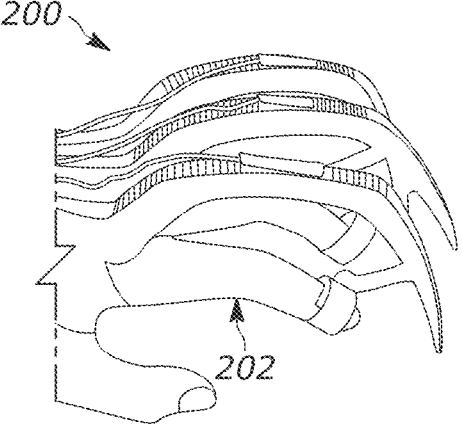
FIG. 2 illustrates an example control interface on a user's hand.

FIG. 2 is an image depicting an example user interface device 200 placed on a user's hand 202 and configured to control movement of a robot. The user interface device 200 is adapted to enable precise placement of limbs (e.g., feet) with small finger motions on one hand 202. For example, the user interface device 200 has an arrangement of sensors configured to sense movement of a user's finger and provide corresponding sensor signals representative of the sensed finger movement. A controller (e.g., microcontroller or processor—not shown) is configured to generate robotic control signals to actuate motors (or other actuators) to lift a respective leg (or multiple legs) of an articulated mobile (e.g., robot 100) based on the sensor signals. The controller can be implemented in the robot, in the user interface device (e.g., glove) or controller functions can be distributed between the robot and the user interface device. In some examples, the user interface device 200 can be implemented as a hand-to-hexapod control interface (HHCI) configured to control a hexapod robot. The HHCI can be configured to reduce user effort, while specifying leg positions. In other examples, the user interface device 200 can be configured to control other types and configurations of robots.

Figure 3:
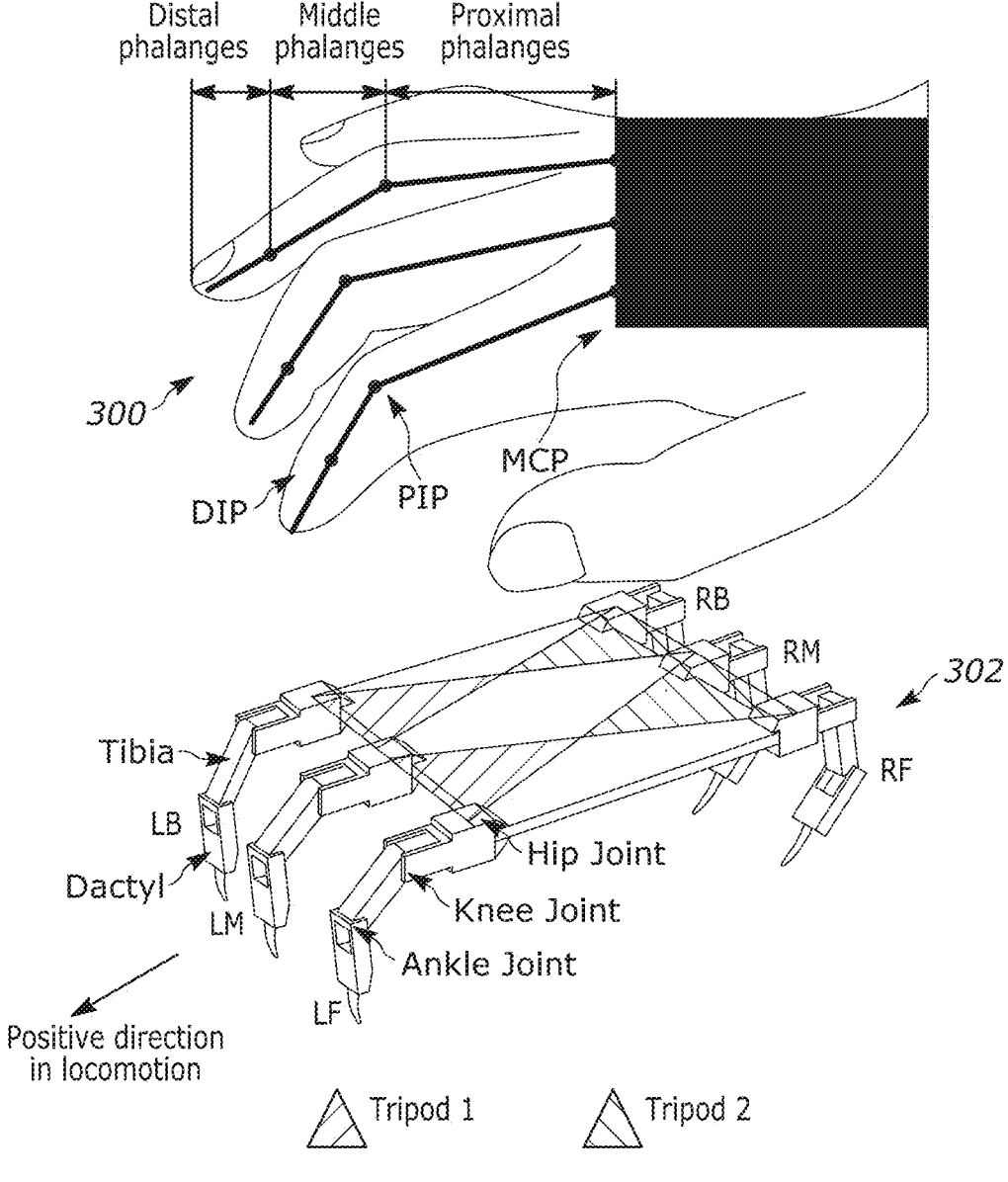
FIG. 3 is a diagram showing the joints in a hand being mapped with kinematics to control legs of a robot.

FIG. 3 is a diagram showing the joints in a hand 300 being mapped with kinematics to control legs of a robot 302, such as described herein. As conceptually demonstrated in FIG. 3, legs of the robot 302 can be divided into two groups to perform a tripod gait in sideways walking, shown as Tripod 1 and Tripod 2. For example, Left-Front leg (LF), Left-Back leg (LB) and Right-Middle leg (RM) are in Tripod 1. Right-Front leg (RF), Right-Back leg (RB) and Left-Middle leg (LM) are in Tripod 2. An HHCI is thus configured to take advantage of the similarities in structure between a human finger and the three degree of freedom (DOF) leg of a hexapod robot. As described herein, the HHCI is configured to enable users to directly control the leg movements of a hexapod robot with finger movements.

As shown in FIG. 3, a robot leg design can have three joints: a hip joint with vertical axis of rotation, a knee joint, and an ankle joint with parallel axes of rotation. Similarly, there are three joints on one finger: the metacarpophalangeal joint (MCP), the proximal interphalangeal joint (PIP) and the distal interphalangeal joint (DIP). There are three segments on one finger: the proximal phalanges, the middle phalanges, the distal phalanges. For human fingers, the MCP has two DOF. The abduction and adduction movement of MCP corresponds to (e.g., can be used to control) the movement of the robot's hip joint. During flexion and extension movement, the motion of the proximal phalanges on a human hand is similar to the desired motion of the tibia on the robot. Thus, the flexion and extension movement of MCP corresponds to (e.g., can be mapped to control) the movement of the robot's knee joint. The robot has one additional flexion joint, the ankle joint, which can be controlled by HHCI responsive to movement of the user's PIP and DIP. The limited flexibility of DIP and the coupling with PIP makes it almost impossible for DIP to control the ankle joint without PIP. With PIP occupied, the MCP is the joint which can correspond to (e.g., can be mapped to control movement of) the knee joint. As described herein, the movement of the MCP, PIP and DIP can be sensed by sensors of the user interface device.

The wearable control interface device is configured to relate motions of a common hexapod leg to finger motions. The following discussion focuses on planar sideways walking of a hexapod robot, which can be controlled based on tracking movement of track two finger joints. Sideways walking can be faster and more efficient than forward walking for a hexapod robot. Furthermore, compared to sideways walking, forward walking requires frequent movement of hip joints, which corresponds to the abduction and adduction movement of MCP. However, the abduction and adduction angles of MCP are limited, and frequent abduction and adduction movement can cause discomfort to the operator, leading to a faster muscle fatigue. In contrast, sideways walking can make full use of the flexibility of fingers in flexion and extension without making the operators feel uncomfortable. Therefore, the wearable interface device is configured to detect and track flexion and extension movements of the fingers. In other examples, the wearable interface can also be configured to detect and track abduction and adduction tracking for controlling forward walk, which can be in addition to or as an alternative to the sideways walking control described herein. Thus, those skilled in the art will understand various approaches to implement a control user interface using different mapping methods for specifying leg placement and movement based on the contents of this disclosure.

FIGS. 4A-4B, 5A-5B, 6, 8, and 10-12 illustrate examples of wearable user interface devices 400, 500, 600, 800 and 1000, which also may be referred to herein as interface devices, gloves, glove devices, remote controller, or similar terms without distinction. The gloves 400, 500, 600, 800 and 1000 are configured to be attached (e.g., fixed in place) on the operator's hand by one or more straps, such as an elastic band and/or hook and loop fasteners (e.g., Velcro®). Other means can be used to attach the wearable user interface device 400, 500, 600, 800, 1000 to the user's hand and fingers. As used herein, the term glove refers to the means of attachment of the control interface device to part of the hand and one or more fingers and does not require a sheath of flexible material covering (wholly or in part) the hand and/or fingers. For example, a glove can include a strap, band or other structure adapted to attach a base part of the device to the metacarpus (e.g., back and/or palm) region of the hand and another portion that attaches to one or more digits (fingers or thumb) that extend from the hand. The attachment can circumscribe the metacarpus and/or digits completely or partially.

In following description, including of FIGS. 4A-12, different example mapping methods are referred to herein as Joint Angle Mapping (JAM) and Tip Position Mapping (TPM). These or other mapping methods can be used separately and/or in combination to provide control instructions to a robot responsive to motion of the glove interface device or other user input devices.

Figure 4A:
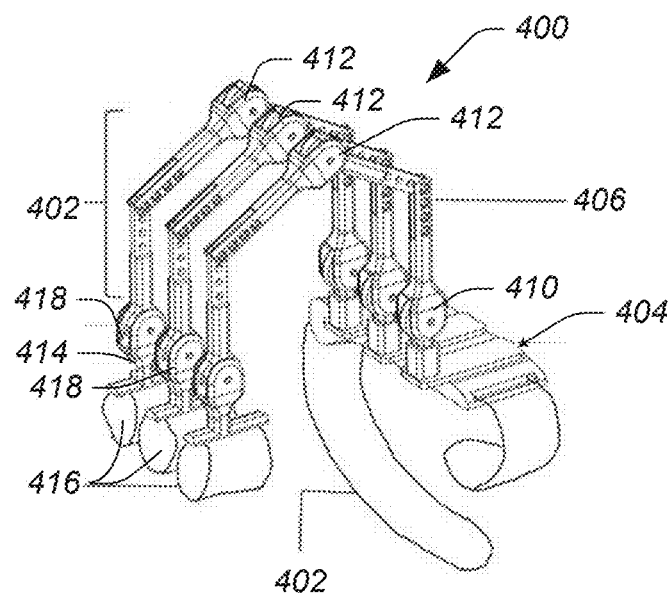
FIGS. 4A-4B illustrate an example of a wearable interface device configured for Joint Angle Mapping.
Figure 4B:
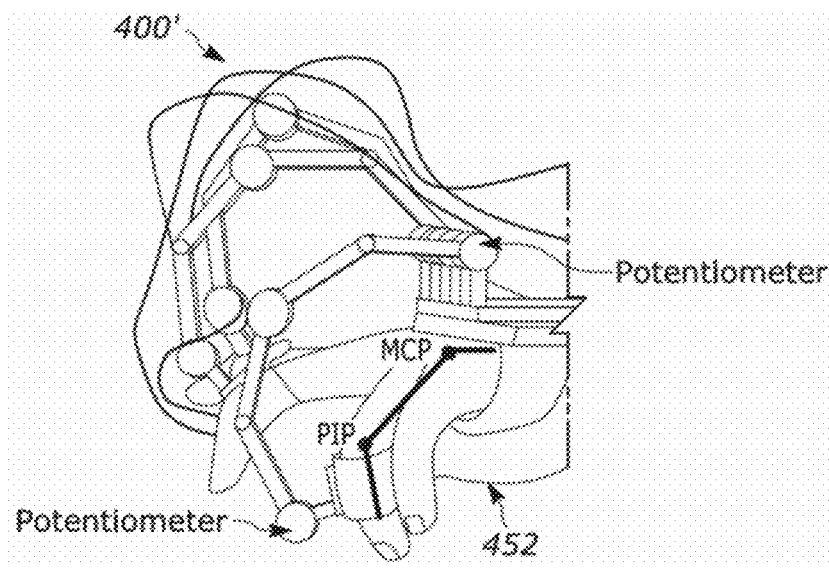

FIG. 4A illustrates an example of the glove 400 configured for JAM. FIG. 4B shows an example prototype of the glove 400, shown at 400' on a user's hand 452. The glove 400, 400' is configured to measure MCP and PIP flexion.

As shown in FIG. 4A, the interface 400 includes a strap (e.g., an elastic band) 402 to attach a base 404 to a user's hand, such as shown in FIG. 4B. The base can be formed of a substantially rigid material, such a plastic or metal material, or a combination of pliant and rigid materials. The device 400 also includes a plurality of fingers, each having respective proximal and distal finger segments 406 and 408. For example, the proximal finger segments 406 are coupled to the base 404 by a joint (e.g., a rotary joint, such as a hinge, pivot, or other rotatable joint) 410 that includes a joint angle sensor. The finger segments 406 and 408 can be straight or curved, or include straight and curved portions. A proximal end of each of the distal finger segments 408 is coupled to a distal end of a respective proximal finger segment 406 by a joint (e.g., a rotary joint, such as a hinge, pivot, or other rotatable joint) 412. Each such joint 412 can also include a respective joint angle sensor. A distal end of each second finger segment 408 can be coupled to a respective finger attachment support 414, and finger straps (or other attachment means) 416 can extend from the finger supports 414. The finger straps 416 are configured to attach the support to a respective finger of the user (see, e.g., FIG. 4B). The second finger segments 408 further can be coupled to the supports 414 by a joint 418, such as rotary joint, each of which can also include a respective joint angle sensor.

In an example, the base 404 and/or finger segments 406 and 408 can be formed using additive manufacturing (e.g., 3D printed). In some examples, the respective joint angle sensors of joints 410, 412 and 418 can be implemented as linear rotary potentiometers configured to provide an output signal (e.g., a voltage) having a value representative of an angle of the respective sensor (e.g., based on impedance depending on the angle of rotation). An example potentiometer that can be used for the joint angle sensors is the PT10MH01-103A2020-S, 10 kΩ, 0.15 W, which is available from Mouser Electronics, Inc., of Mansfield, Texas. Other types of sensors can be used in other examples to provide sensor signals representative of a joint angle.

The interface device 400, 400' is configured to provide respective signals that provide a measure MCP and PIP flexion for each of the fingers. In one example, a controller (or other control circuitry) of the interface device 400, 400' (e.g., mounted to the base 404 or a separate circuit) is coupled to read sensor signals of each of the joint angle sensors. The controller can also be coupled to the robot through a communications link (e.g., a physical or wireless communications link), such as can implement a serial or other bus communication interface. The robot also includes a controller configured to use the finger angles to directly set the robot joint angles. For example, the MCP corresponds to the knee joint motion of the robot. In some examples, the ankle joint corresponds to the PIP motion (rather than the DIP motion) because although they are coupled, the PIP has better flexibility and larger work space than DIP. Thus, the fingertips of the interface device 400 are fixed on the middle phalanges of the operator through 3D printed rings and finger straps, such as shown in FIG. 4B. The movement of the fingers is detected (e.g., measured) by the angle sensors, whose voltages will be recorded in memory of the controller, and the controller is configured to calculate the flexion and extension angles of MCP and PIP through inverse kinematics. In this way, the user is able to control the robot joints by mapping the finger joint angles directly to the robot leg joint angles.

Figure 5A:
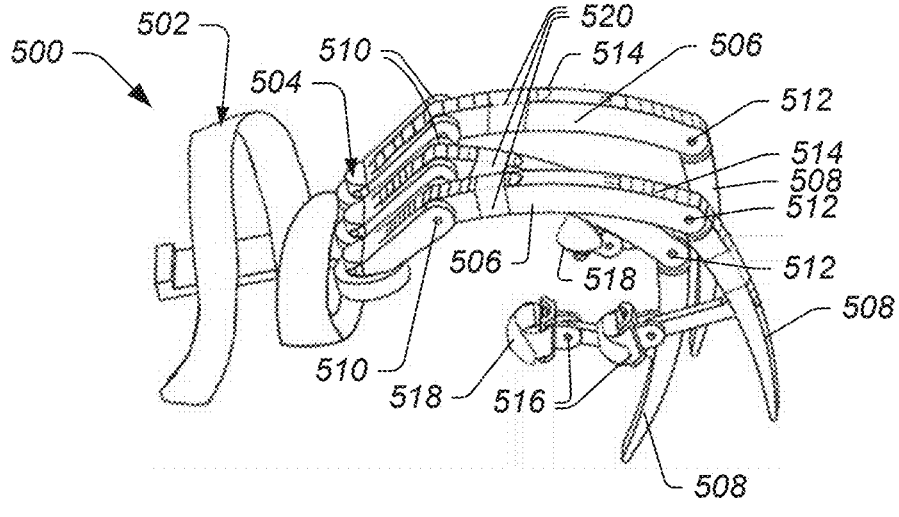
FIGS. 5A-5B illustrate another example of a wearable interface device configured for Tip Position Mapping.
Figure 5B:
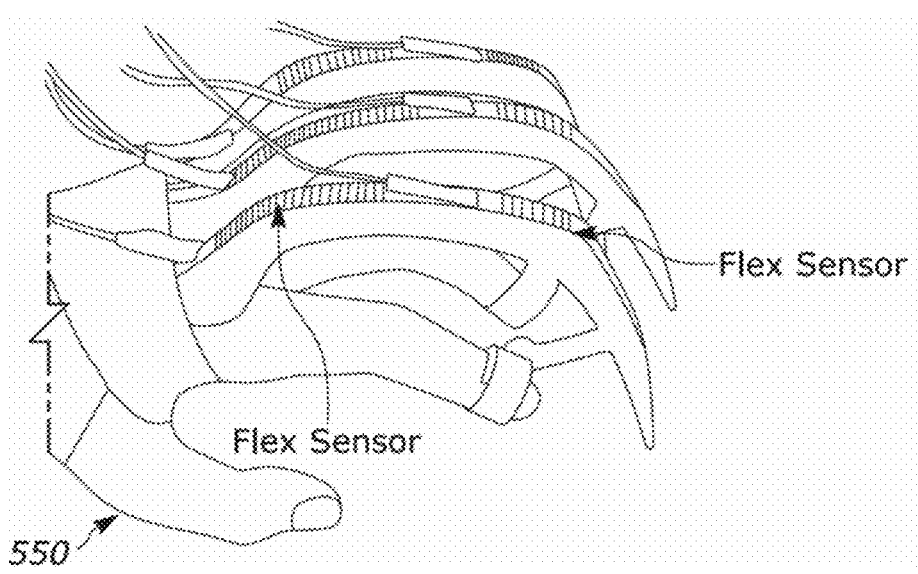

FIG. 5A illustrates an example of the interface device (e.g., a glove device) 500 configured for TPM. FIG. 5B shows an example prototype of the glove 500, shown at 500' on a user's hand 552. The example glove 500, 500' is configured to measure MCP, PIP and DIP flexion.

As shown in FIG. 5A, the glove 500 includes a band (e.g., strap) 502 that is coupled to a base member 504. The band 502 can be implemented as an elastic knit band with a hook and loop fastener to secure the base member 504 on the back of a user's hand, such as shown in FIG. 5B. The base member 504 can be formed of a substantially rigid material, such as a plastic or metal material.

The glove 500 also includes one or more (e.g., a plurality of) fingers extending from the base member 504. Each of the fingers includes having first and second finger segments (also referred to as dactylus members) 506 and 508. The finger segments 506 and 508 can be straight, curved, or include straight and curved portions. In the example of FIGS. 5A and 5B, the finger segments 506 and 508 are shown as curved dactylus members having opposing convex and concave surfaces, and the flex sensors are on the convex surface. The flex sensors could be on other surfaces or embedded within the respective finger segments in other examples. A proximal end of each first dactylus member 506 is coupled to base by a respective joint 510 (e.g., a rotary joint, such as a hinge, pivot, or other type of movable joint). Part of the joints 510 can be fixed to (or integral with) the base member 504. A distal end of each first dactylus member 506 is coupled to a proximal end of the second dactylus member 508 by another joint 512 (e.g., a rotary joint, such as a hinge, pivot or other type of movable joint). In the example of FIGS. 5A and 5B, each finger includes one or more respective flex sensors 514 disposed along a length of the finger. For example, a respective flex sensor 514 can be coupled to a surface (e.g., shown coupled to a top finger surface) of each finger and extend over one or both joints 510 and 512. In other examples, multiple flex sensors can be used, in which a first flex senor extends over the joint 510 and along a portion of the dactylus member 506 and a second flex senor extends on the joint 512 and along portions of the dactylus members 506 and 508. The flex sensors thus are configured to measure MCP, PIP and DIP flexion and provide respective sensor signals representative of the shape and relative position of each of the dactylus members 506 and 508. An example flex sensor that can be used for the sensors 514 is the Adafruit Short Flex Sensor, which is available from Adafruit Industries, LLC of New York, New York. Other types of flex sensors or fingertip position sensors (e.g., optical sensors, angle sensors, or the like) can be used in other examples. While the glove 500 is described as including flex sensors, in other examples, the sensors could be implemented as one or more encoders adapted to provide sensor signal encoding the measured motion of finger, including motion of finger segments 506 and 508 and/or motion of one or more joints 510 and 512.

In the example of FIGS. 5A and 5B, a respective finger attachment support (e.g., a plate, bracket, clamp, or clip) 516 is coupled to each second dactylus member 508. A respective finger strap (or other attachment means) 518 can extend from each of the finger supports 516. Each of the finger straps 518 is arranged and configured to attach the support to a respective finger of the user (see, e.g., FIG. 5B showing strap around a fingertip). In an example, one or more sleeves (e.g., rings or slide members) 520 are applied over each dactylus member 506 and 508 and the flex sensor 514 to ensure that the flex sensor 514 remains secured along the length of each dactylus member during movement of the user's fingers. The sleeve 520 can have a smooth radially inner surface that contacts at least a portion of the flex sensor 514. The part of the radially inner surface that does not contact the flex sensor 514 can include an adhesive to hold the sleeve at a fixed axial position along the finger segment (s). In this way, the sleeve 520 can permit sliding movement of each flex sensor 514 relative to the associated sleeves 520 and also be held against the surface of the finger segments and joints, such as during flexion of the finger segments. Multiple sleeves can be used at spaced apart locations, such as shown in FIGS. 5A and 5B, or a single sleeve can be provided over the flex sensor 514 along the length of each finger. As a further example, two- or three-degree-of-freedom force sensors can be implemented at the finger attachment support 516 and configured to provide a force sensor signal representative of multi-axial force at the fingertip.

In one example, a controller (or other control circuitry) of the interface device 500 or 500' (e.g., mounted to the base 504 or separately from the base) is coupled to each of the flex sensors 514. The controller (or other circuitry of the interface device 500 or 500') is also coupled to the robot through a communications link (e.g., a physical or wireless communications link), such as can implement a serial or other bus communication interface. The movement of the fingers is detected by the flex sensors 514 (e.g., measured voltages), and stored in memory of the controller of the interface device 500 or 500'. The controller is configured to calculate resulting fingertip position through forward kinematics based on the measured voltages from the respective flex sensors 514. The fingertip position data is provided to the robot. For example, the robot includes a controller further configured to compute corresponding robot joint angles for the robot legs based on applying inverse kinematics with respect to the calculated fingertip positions. The robot can include servo motors or other actuators configured to move respective robot legs based on the computed robot joint angles. In this way, the user is able to control the robot foot tip positions by mapping the interface finger tip positions directly to the robot foot tip positions.

In the TPM glove 500, 500' (in contrast to the JAM glove 400), DIP motion is included because total flexion is captured at the finger tip. The finger tips of the glove 500, 500' can be fixed on the distal phalanges of the operator (see FIG. 5B) through finger supports 516 and finger straps 518. The movement is detected by flex sensors 514, whose voltages are recorded and used to calculate the resulting finger tip position through forward kinematics.

As described herein, the control interface device (e.g., glove) can be configured to control locomotion or other functions of the robot responsive to sensed motion of one or more fingers of the user through a communications link (e.g., wired or wireless). In some examples, the control interface device can assign a mapping between a finger of the control device and one or more associated limbs of the robot. Thus, the number of fingers implemented in the control interface device can vary depending on the functions to be controlled by user-finger motion and/or intended use environment.

Figure 6:
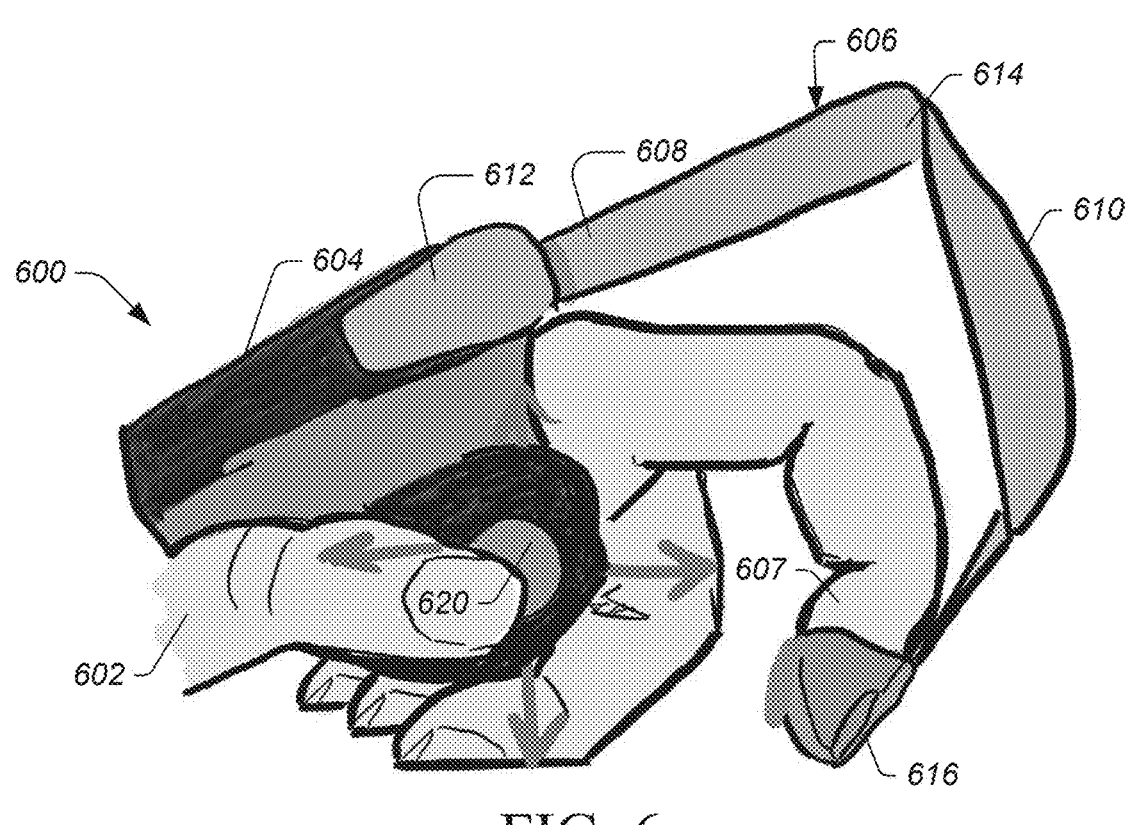
FIG. 6 illustrates another example of a wearable interface device.

As an example, FIG. 6 illustrates another example of a wearable interface device (also referred to as a glove or interface device) 600 configured to attach to a user's hand 602 to control a robot (e.g., robot 700 shown in FIG. 7) based on motion of single finger of the user. The interface device 600 can be configured to implement TPM and/or JAM, such as described herein.

The interface device 600 includes a base member 604 adapted to be secured to the user's hand 602. The base member 604 can include top and bottom portions adapted to attach the interface device to the user's hand 602, which can circumscribe the metacarpus completely or partially. In the example of FIG. 6, the interface device 600 also includes a single finger 606 extending from the base member 604, which can be coupled to a finger (e.g., index finger) 607 of the user's hand 602 as shown. The finger 606 can include first and second finger segments (also referred to as dactylus members) 608 and 610. The finger segments 608 and 610 can be straight, curved, or include straight and curved portions. A proximal end of the finger segment 608 is coupled to base member 604 by a respective joint (e.g., a rotary joint, such as a hinge, pivot, or other rotatable joint) 612. Part of the joints 612 can be fixed to (or integral with) the base member 604. A distal end of the first finger segment 608 is coupled to a proximal end of the second finger segment 610 by another joint (e.g., a rotary joint, such as a hinge, pivot, or other rotatable joint) 614. A finger attachment support (e.g., a plate, bracket, clamp, or clip) 616 can be coupled to the distal end of the second finger segment 610. The finger attachment support 616 is configured to secure the distal end of the second finger segment 610 to a distal end portion (e.g., tip) of the index finger 607.

As described herein, the control interface 600 includes an arrangement of one or more sensors to measure motion of the user's hand 602, such as the index finger 607 to which the finger 606 of the control device is coupled. For example, the sensor(s) can be implemented as joint angle sensors at respective joints 612 and/or 614, flex sensors (e.g., flex sensors 514), optical sensors, motion sensors (e.g., a 2 degrees of freedom (DOF) sensor, 3 DOF sensor or more DOF's) or as a combination of such sensors adapted to provide a motion signal representative of motion of the user's finger 607.

In the example of FIG. 6, the control device 600 also includes one or more additional user input devices, shown as a joystick 620. The joystick 620 can be moved using the thumb of the same hand as the finger 607 that is used to move the finger 606 of the control device. Of course, any finger on the other hand can be used alternatively to move the joystick 620. The joystick 620 can provide control signals based on a direction and/or amount of movement of the joystick lever, which for an example, the joystick control signals can represent a direction for a robot and the motion of the finger 607, which is sensed by respective motion sensors, can be mapped to movement of one or more appendages (e.g., legs) of the robot. Also or as an alternative, other types of user input devices (e.g., pushbuttons, slides, knobs, touchscreen interface controls, or the like) can also be used to receive additional robot control commands.

Figure 7:
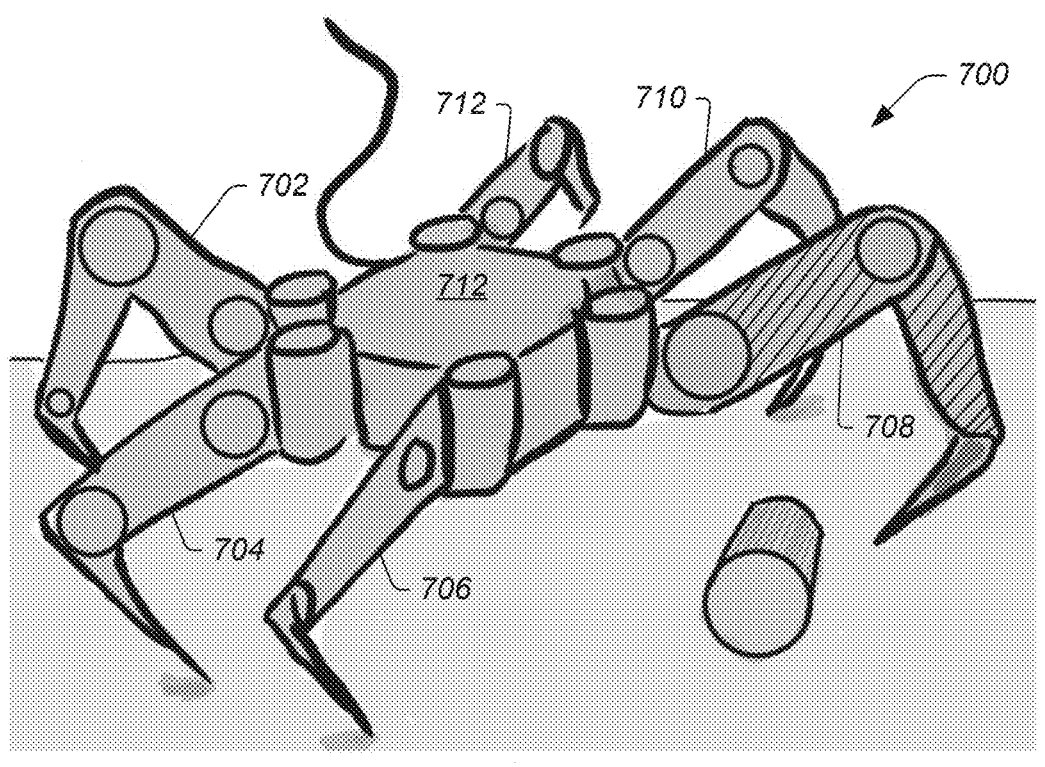
FIG. 7 illustrates an example of a locomotive robot that can be controlled with the interface device of FIG. 6.

FIG. 7 illustrates an example of a robot 700 (e.g., a locomotive robot) that can be controlled with the interface device 600 of FIG. 6. In the example of FIG. 7, the robot 700 is a legged robot that includes a central body 701 from which a plurality of legs 702, 704, 706, 708, 710, and 712 extend to terminate in distal ends of the respective legs. Other types of robots can be controlled by the interface device in other examples. The body 701 can include a robot controller configured to control a position and/or movement of the distal end of one or more of the legs of the legged robot based on the control signals from the control interface 600. Also, the robot controller can control motion of the robot 700 based on one or more local sensors (e.g., force sensors, position sensors, encoders, motion sensors, optical sensors and the like) implemented on the robot. As an example, in a walking mode, the robot 700 can be configured to perform an automated gait in a direction control responsive to a joystick control signal provided through the joystick user input device 620. The robot 700 can control motion of a signal given leg (e.g., the leg 708) or multiple respective legs to which the motion of the finger 606 is mapped. For example, the robot controller can control one or more actuators to effect motion of the leg 708 responsive to the sensor signals (representing motion and/or position of the index finger 607) from the control interface 600 received at the robot controller over the communications link.

Figure 8:
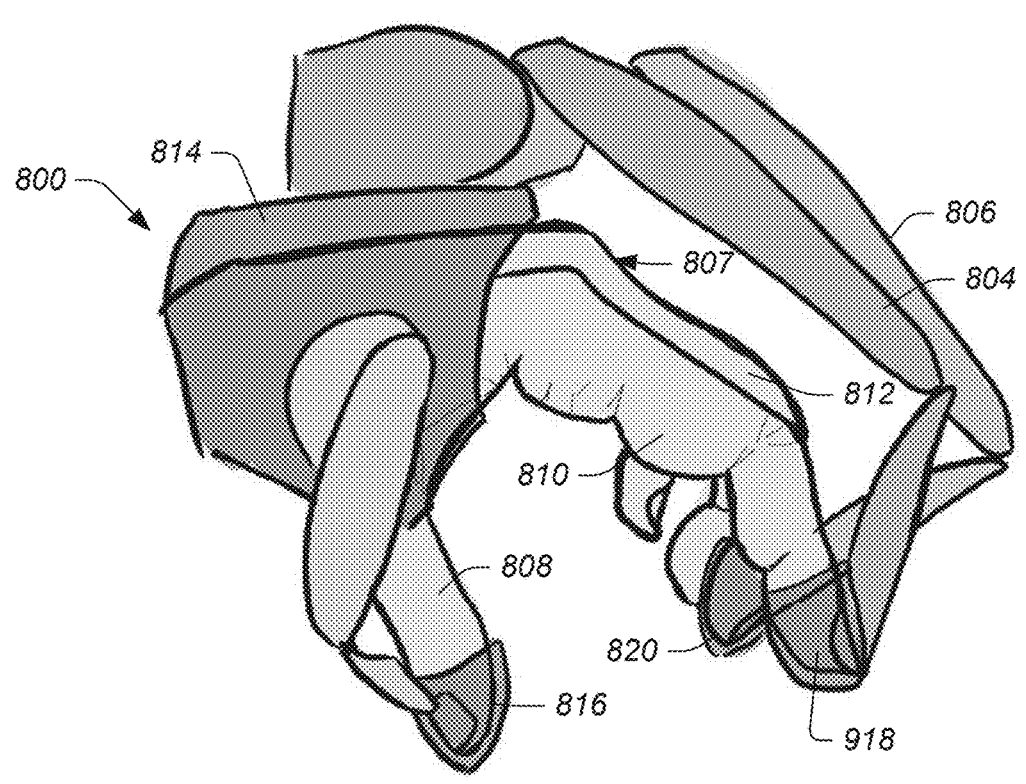
FIG. 8 illustrates another example of a wearable interface device.

FIG. 8 illustrates another example of a wearable interface device 800. The interface device is similar to the example of FIG. 6, but includes three fingers 802, 804, and 806 and the joystick input device 620 has been omitted. The interface device 800 is configured to attach to a user's hand 807 to control a robot (e.g., robot 900 shown in FIG. 9) based on sensed motion of respective fingers 808 (thumb), 810 (index finger), and 812 (middle finger) of the user's hand. The interface device 800 can be adapted to include any number of fingers and/or types of input controls described herein, and further can be configured to implement TPM and/or JAM.

The interface device 800 includes a base member 814 adapted to be secured to the user's hand 807. The base member 814 can include top and bottom portions adapted to attach the interface device to the user's hand 807, which can circumscribe the metacarpus completely or partially. In the example of FIG. 8, each of the fingers 802, 804, and 806 extends from the base member 604 and is adapted to couple with a respective finger 808, 810, and 812 of the user's hand 602 as shown. Each finger 802, 804, and 806 can include respective first and second finger segments (dactylus members) such as described herein. Each finger 802, 804, and 806 thus can include an arrangement of one or more joints and respective finger attachment supports (e.g., a plate, bracket, clamp, or clip) 816, 818, and 820 at the distal end of the respective fingers. For example, the motion of each of the fingers 802, 804, and 806, which is sensed by respective sensors, can be mapped to movement of one or more appendages (e.g., legs) of the robot. Also or as an alternative, other types of user input devices (e.g., joysticks, pushbuttons, slides, knobs, touchscreen interface controls, or the like) can also be used to provide additional robot control commands.

Figure 9:
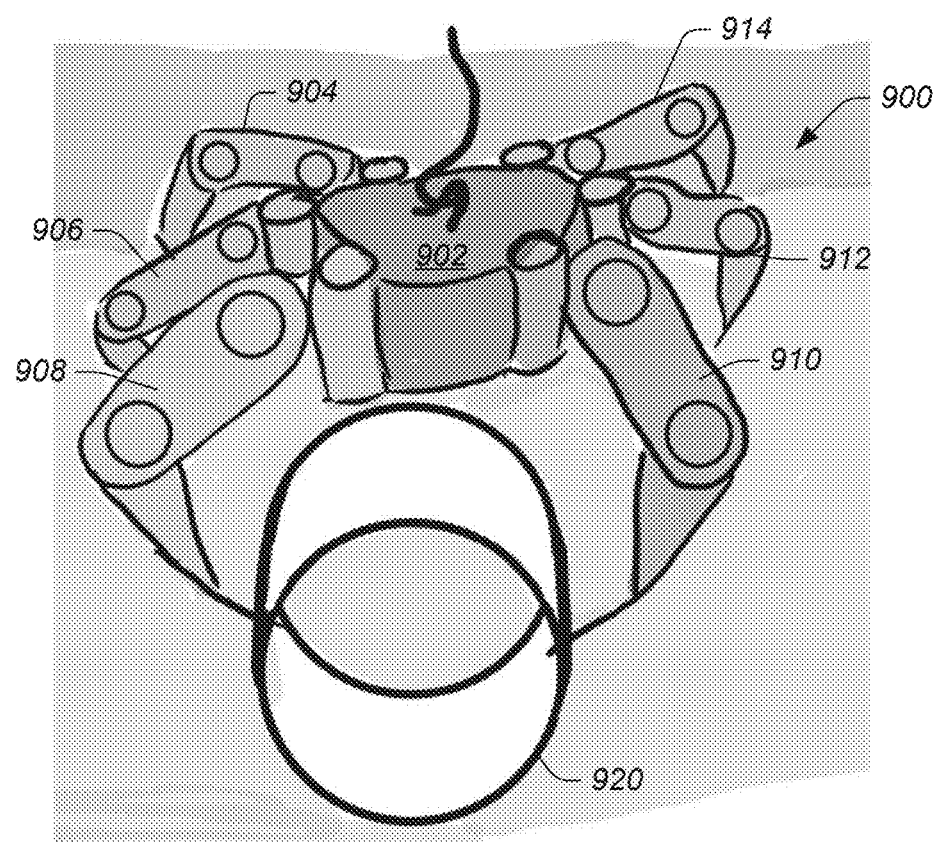
FIG. 9 illustrates an example of a locomotive robot that can be controlled with the interface device of FIG. 8.

FIG. 9 illustrates an example locomotive robot 900 that can be controlled with the interface device 800 of FIG. 8. In the example of FIG. 9, the robot 900 is a legged robot having the same configuration as the robot 700. The robot thus includes a central body 902 from which a plurality of legs 904, 906, 908, 910, 912 and 914 extend to terminate in distal ends of the respective legs. Other types of robots can be controlled by the interface device in other examples. The body 902 can include a robot controller configured to control a position and/or movement of the distal end of one or more of the legs 904, 906, 908, 910, 912 and 914 of the legged robot based on the control signals from the control interface 800. For example, the sensed motion of the finger 802 can map to control motion of the leg 908 and the sensed motion of the finger 804 can map to control motion of the leg 910, which directly opposes the leg 908, such as to perform a grasping function of an object 920 responsive to sensing a grasping motion between the thumb 808 and index finger 810. The sensed motion of the finger 806 can map to control one or more actuators to effect motion of the other legs 904, 906, 912 and 914, such as to perform a walking function. The robot controller can control motion of the robot 900 based on one or more local sensors (e.g., force sensors, position sensors, encoders, motion sensors, optical sensors and the like) implemented on the robot. For example, the robot controller of robot 900 can control one or more actuators thereof to effect motion of the legs responsive to the sensor signals (representing motion and/or position of the user's fingers 808, 810, and/or 812) from the control interface 800 received at the robot through the communications link.

Figure 10:
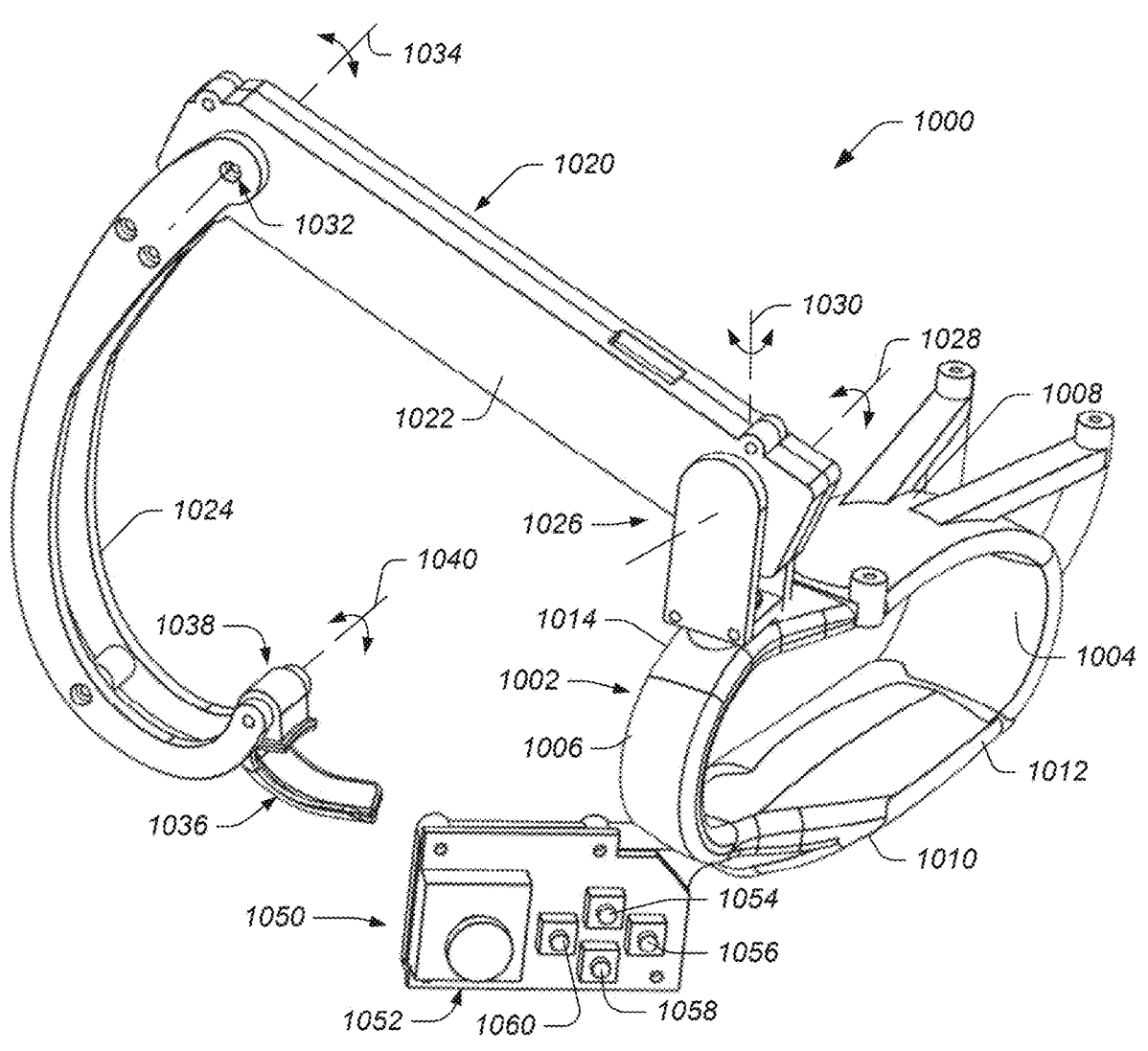
FIG. 10 illustrates yet another example of a wearable interface device.
Figure 11:
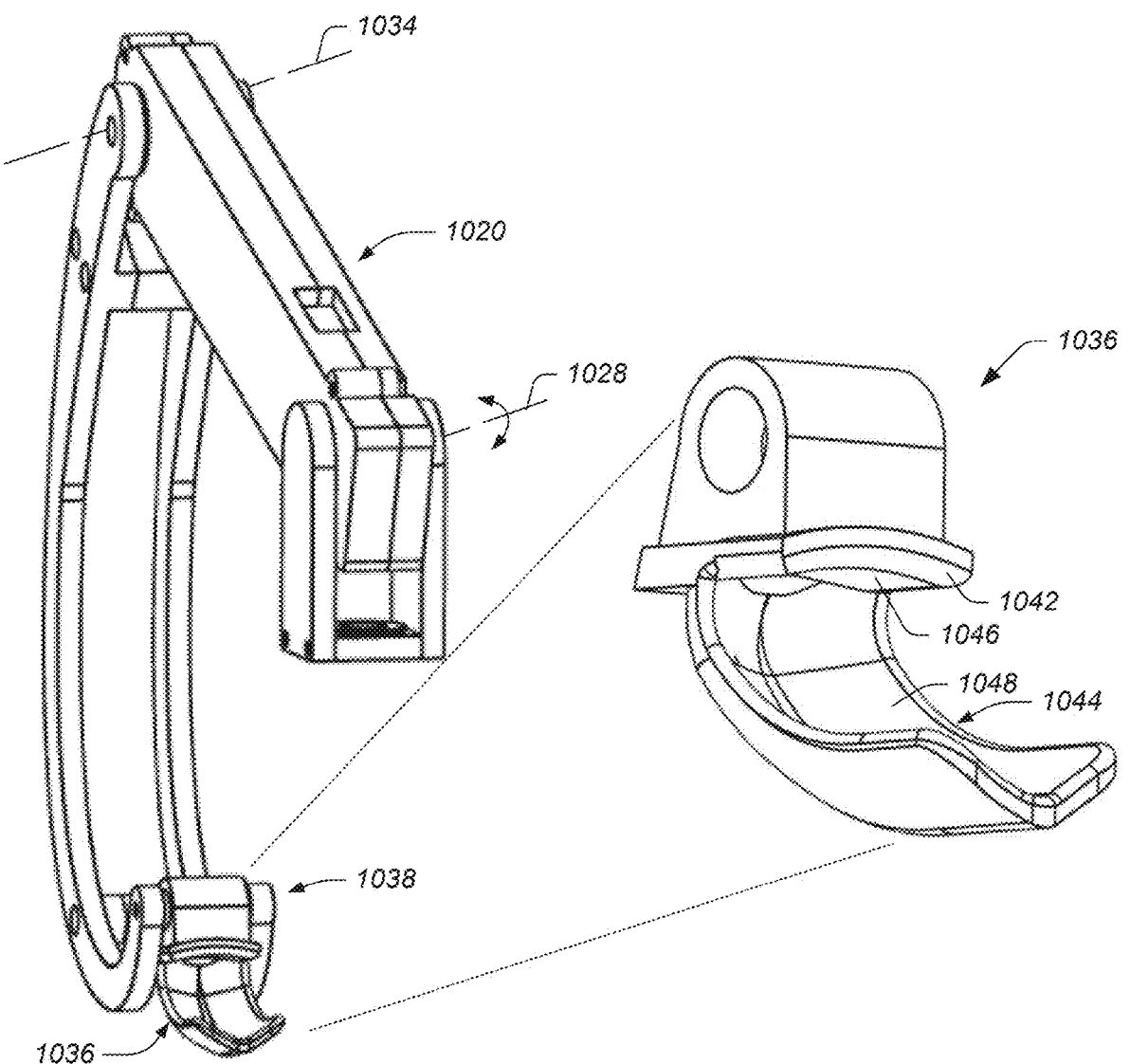
FIG. 11 illustrates a finger and finger clamp of the wearable interface device of FIG. 10.
Figure 12:
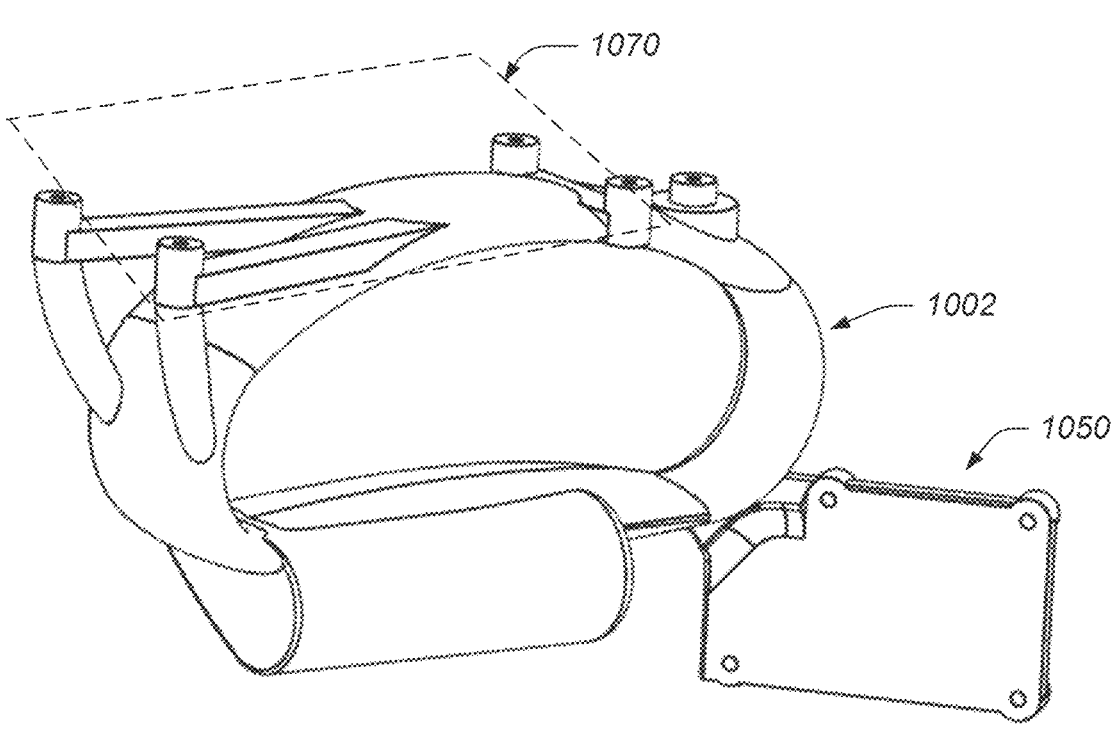
FIG. 12 illustrates the base portion of the wearable interface device of FIG. 10.

FIGS. 10-12 illustrate yet another example of wearable interface device 1000 (also referred to as a glove or interface device) that can be used to control a robot (e.g., robot 100, 302, 700, 900). The interface device 1000 is an example of a single finger interface device similar to the interface device 600 of FIG. 6. Accordingly, the description of FIGS. 10-12 may refer to aspects of the description of FIGS. 6-7.

The interface device 1000 includes a base 1002 that is configured to attach the device to a user's hand or wrist. The base 1002 can be formed of a substantially rigid material, such a plastic or metal material, or a combination of pliant and rigid materials. The base 1002 can include a passage (e.g., opening) 1004 extending through the base. The passage 1004 provides a base attachment mechanism dimensioned and configured to circumscribe the metacarpus of a user's hand, completely or partially. The base attachment mechanism thus is adapted to hold the base 1002 at a desired position with respect to the user's hand. The size of the passage 1004 can be fixed or adjustable, such as through changing the length of a strap that forms part of or circumscribes the base 1002. The base 1002 can include a sidewall portion 1006 having a opposing sides 1008 (e.g., a top side) and 1010 (e.g., a bottom side) and through which the passage extends axially between proximal and distal ends 1012 and 1014, respectively.

As shown in FIGS. 10 and 11, the interface device 1000 also includes a finger 1020 extending longitudinally from the base 1002. In the example of FIGS. 10 and 11, the finger 1020 includes first and second finger segments 1022 and

1024, respectively, which can be formed of rigid materials (e.g., metal and/or plastic). Other numbers and configurations of finger segments can be used in other examples. A proximal end of the first finger segment 1022 is coupled to the side 1008 of the base 1002, such as by a joint 1026. The joint 1026 can be configured to enable movement of the first finger segment 1022 relative to the base 1002 in one or more directions. For example, the joint 1026 is in the form of a multi-axial coupling (or multiple couplings) configured to provide for rotation of first finger segment 1022 relative to the base 1002 about one or more axes 1028 and 1030. The joint 1026 can also be configure to provide for abduction and adduction of the first finger segment 1022 commensurate with abduction and adduction of a user's finger (e.g., along a plane extending through one or both of the axes 1028 and 1030).

A proximal end of the second finger segment 1024 is coupled to a distal end of the first finger segment 1022 by another joint (or other coupling) 1032. The joint 1032 can be adapted to enable rotational movement of the second finger segment 1024 relative to the first finger segment 1022, such as about an axis 1034. The joint 1032 can enable additional degrees of freedom between the finger segments 1022 and 1024. The finger 1020 also includes a finger attachment support 1036 coupled to a distal end of the second finger segment 1024. The finger attachment support 1036 is configured to attach the finger 1020 with respect to a distal phalange (e.g., fingertip) of a user. For example, a movable joint 1038 can be coupled between the distal end of the second finger segment 1024 and the finger attachment support 1036 to enable relative movement of the finger attachment support 1036 along one or more degrees of freedom (e.g., rotation) with respect to an axis 1040.

As shown in the enlarged view of the finger attachment support 1036 of FIG. 11, the finger attachment support 1036 can be in the form of a clip having spaced apart clamp members 1042 and 1044 adapted to receive a user's finger between the clamp members. The clamp members can be rigid or pliant materials. The clamp member 1042 (e.g., a top portion) can include a contact surface 1046 configured to engage a first side (e.g., top side/fingernail) of the user's finger. The other clamp member 1044 (e.g., a lower portion) can include a contact surface 1048 configured to engage a second side (e.g., bottom side/fingernail) of a user's finger. The clamp member 1044 and the contact surface 1048 thereof can be curved in a direction away from the opposite contact surface 1046 to facilitate receiving and holding the user's finger in the finger attachment support 1036. In an example the surface 1046 is substantially flat (e.g., planar) and the surface 1048 is concave along its length (e.g., forming a finger-receiving channel or receptacle). A strap or other attachment means (not shown) can be used to help hold the user's finger at a fixed position with respect to the finger attachment support 1036 (e.g., between clamp members 1042 and 1044.

In some examples, the finger attachment support 1036 can include a haptic device (e.g., mechanical, electrotactile and/or thermal feedback mechanism) can be incorporated into one or more actuators and configured to provide haptic feedback to the user. For instance, the finger attachment support 1036 can include an actuator configured to adjust the distance between clamp members 1042 and 1044 and provide a clamping force on the finger responsive to force sensed at a foot of the robot (e.g., by a contact force sensor on the robot's foot). Also, or as an alternative, one or more force sensors can be provided on the surface(s) 1046 and/or 1048 to detect force on the user's finger, in response to which haptic feedback (e.g., tactile or otherwise) can be provided to the user through one or more haptic devices on the control interface 1000. As a further example, one or more other uni- or multi-modal feedback mechanisms can be incorporated into other parts of the control device 1000, such as in joints or the base 1002, to provide additional feedback to the user responsive to one or parameters sensed at the robot and/or at the control interface itself.

The interface control device 1000 can include one or more sensors coupled to the finger 1020. Such sensor can be configured to provide a sensor signal representative of a position and/or movement of the distal end of the finger (e.g., at attachment support 1036). In an example, one or more sensors can be provided to measure relative motion provided by each movable joint 1026, 1032 and/or 1038. In another or alternative example, one or more sensors can be configured to sense relative movement of the first finger segment and the base and provide sensor signals representative of such motion (e.g., magnitude and direction). The motion sensors can include flex sensors, joint angle sensors (e.g. potentiometers), encoders, or other motion sensors. The sensor signals can be provided to a processor or microcontroller on the interface device 1000, which can compute motion and/or position of the fingertip based on forward kinematics applied to the sensor signals. In other examples, the processor or microcontroller can be remote from the control device or be distributed across the control device and remote system. Also, or as an alternative, one or more sensors can be provided at the finger attachment support 1036 configured to measure force (e.g., magnitude and direction) on the user's fingertip along one or more degrees of freedom. In further example, one or more sensors (e.g., optical sensors, magnetic or hall-effect position sensors, displacement sensors or the like) can be configured to measure a relative position (e.g., two-dimensional or three-dimensional position) between a distal end of the finger 1020 and the base 1002 or provide measurements from which the relative position between a distal end of the finger 1020 and the base 1002 can be derived.

While the example interface control device 1000 is shown as having one finger 1020, in other examples, the control device 1000 can have a greater number of discrete fingers, which can be implemented as a plurality of instances of the finger 1020. Each instance of the finger further can include one or more sensors configured to measure motion and/or position based on movement of respective finger segments. Each finger can include two or more finger segments coupled end to end along the length of the respective finger by an arrangement of movable (e.g., rotating) joints.

The interface control device 1000 can include a control console 1050 that includes one or more additional user input devices 1052, 1054, 1056, 1058, and 1060. For example, the control console 1050 includes a housing, which can contain a circuit board and circuitry implemented thereon. The housing can include a surface 1062 from which the respective input devices 1052, 1054, 1056, 1058, and 1060 extend to be made accessible for entering user inputs. For example, the user input device 1052 is a joystick and the other input devices are shown as pushbuttons 1054, 1056, 1058, and 1060. Other types of input devices can be used in other examples, or they might be omitted.

In the example of FIG. 10, the control console 1050 extends laterally from the sidewall 1006 of the base 1002, such that the user input devices are adapted to be accessed by a user's thumb while the metacarpus or wrist of the same hand resides within the passage 1004. Accordingly, the user's other hand can be available to perform other tasks.

Each of the user input devices 1052, 1054, 1056, 1058, and 1060 can be configured to implement a desired control function of the robot and, in some examples, can be user programmable. In an example, the joystick 1052 can be used to control a direction or robot locomotion and the other input devices 1054, 1056, 1058, and 1060 can control one or more other robot functions or tasks, which can vary according to application requirements and/or the intended use environment.

Figure 13:
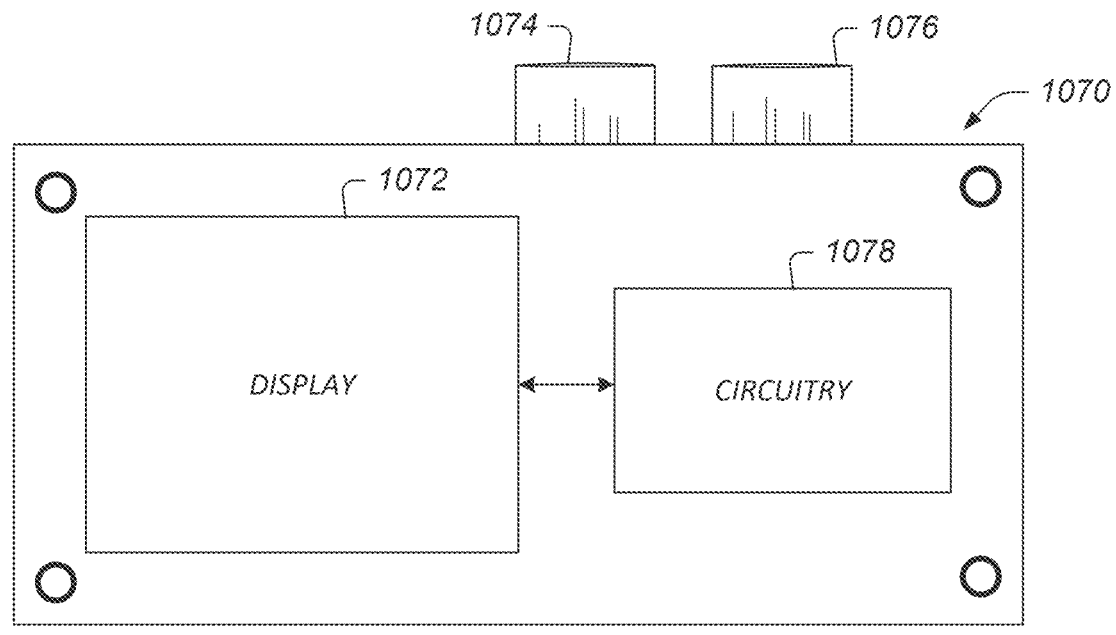
FIG. 13 illustrates an example of a circuit board and display that can be attached to the base portion of FIG. 12.

Referring to FIGS. 12 and 13, the interface control device 1000 can also include a second console 1070 that includes one or more additional user interface devices 1072, 1074, 1076 and associated circuitry 1078. The console 1070 can be mounted to the side 1008 of the base or to another location. The console 1070 can include an arrangement of apertures that can be secured by fasteners (e.g., by screws, adhesive, or other fastening means) at corresponding mounting locations (e.g., threaded holes) of the base 1002. In the example of FIG. 13, the user interface device 1072 is a display and the devices 1074 and 1076 are knobs (e.g., coupled to potentiometers). Other types of user interface devices can be used in other examples.

The display device 1072 can be a liquid crystal display or light emitting diode display. The display device 1072 further can be configured as a touchscreen interface, which can be used to enter user input instructions (e.g., with a finger or stylus), such as for configuring the control interface 1000 (e.g., setting an operating mode) and/or controlling the robot. The display device 1072 is configured to display information to the user, such as including feedback information about the control interface 1000 and/or robot being controlled. In an example, the display device 1072 can display an image or video acquired by one or more cameras carried by the robot, such as in response to image and/or video data received through a communications link with the robot. Also, or as an alternative, the display device 1072 can include a readout (e.g., text and/or graphical output) based on sensor data acquired by one or more sensors carried by the robot and sent to the control interface 1000 through the communications link.

The knobs 1074 and 1076 (e.g., potentiometers) can be used to control particular robot functions. For example, the knob 1074 can be used to control the height of a robot body (e.g., by adjusting joint angles), and the knob 1076 can be used to control the size (e.g., diameter) of the base. Other robot functions can be controlled by the same or similar user input devices 1072, 1074, 1076 that can be implemented depending on the type of robot, application requirements, and/or use environment.

As mentioned, the interface control device 1000 can also include an interface controller, which can be implemented on one or more circuit boards, such as the control console and/or the feedback console. The interface controller includes circuitry (e.g., a microprocessor or microcontroller) configured to provide control signals representative of a motion of the finger 1020 and/or a position of a fingertip of the user's finger based on the one or more sensor signals.

The circuitry of the console 1050 and/or circuitry 1078 of the console 1070 can be configured to provide user device signals responsive to user inputs provided through the user input devices 1052, 1054, 1056, 1058, 1060, 1072, 1074 and/or 1076. The user device signals can be combined (e.g., by an interface controller) with respective sensor signals (e.g., motion, position, force, etc., such as described above) to generate robot control instructions. As mentioned, the interface controller can be configured to implement JAM and/or TPM, such as described herein. The interface device

1000 can also include communication circuitry (e.g., a communication interface), such as part of one or both consoles 1050 and 1070 configured to send control instructions to the robot (e.g., robot 100, 302, 700, 900) through a respective communications link, which can be wired (e.g., for a tethered robot) or wireless. The robot can include a processor or microcontroller configured to apply inverse kinematics to control one or more actuators of the robot to move the robot or perform other functions based on the control instructions and robot state information (e.g., known robot geometry and position).

For the TPM glove 500, 500', a user can visualize the robot's leg by looking at the hardware dactyl attached to the finger, which can be arranged and configured to have the same proportions as the robot's leg. In contrast, for the JAM glove 400, 400', the leg motions correspond more directly to the operator's finger.

As a further example, a precision test can be used to check whether the sensor's value is consistent during repeatable movement. According to tests made by other researchers, a standard deviation and mean error within 10° is precise enough for a glove's sensor. During the test, the glove is not worn, but rather the base is fixed on a platform of fixed height. Reference positions A and B are marked on a paper template and the glove fingers are moved to these two marks. At position A, the foot is taped to the mark. At rest, the sensor voltages are sampled 20 times with MATLAB. Then the finger tip is moved to position B, and the sensors are read again. The test is repeated 20 times, recording 400 values for each sensor on each position. The mean and standard deviation of all recordings of each sensor on each position are calculated. A glove with lower standard deviation values and mean error can be considered as the glove which is more stable and precise in recording values of repeated positions.

The performance of the interface devices 400, 500, 600, 800, 1000 can also be evaluated when a human user is added to the control loop. This is different from previous precision tests because the human user can adjust the position of their finger to achieve a desired result in real time.

As an example, an interaction efficiency test can measure how quickly and accurately the user can get a single simulated leg into position. The test can include a simplified simulation of sideways walking control for hexapod robot, in which specified leg placement is required. In an example, 15 lab staff performed the test, using their index fingers to control a simulated robot leg with both gloves to reach a certain target position on the simulated ground, such as shown FIGS. 14A and 14B. FIG. 14A, is an example test set up in which an operator controls a simulated robot leg to reach a target position on the simulated ground. FIG. 14B depicts an example simulation environment for the interaction efficiency test. One full test of each glove consists of a sequence of 15 randomly generated target positions. Once the robot foot tip crosses the ground line or touches the target, the trial will be ended, and the target position will be refreshed.

Efficiency can be quantified in two dimensions. The first dimension is the time spent. The time for each trial reflects the effort and frustration during operation. The less time spent means the less effort required and the less frustration during operation, in other words, the interface device (e.g., device 400, 500, 600, 800 and 1000) is easy to operate. The second dimension is the distance between the target and the final foot tip position. Errors in distance reflect if the user controls the foot to impact the ground earlier or later than the desired position, which reflects the effectiveness of performance. A small distance means the user can perform effectively and reduce the risk of touching obstacles by mistake when specifying leg placement. The results are filtered out if the distance is larger than 5 cm, which means the user fails to reach the target or impacts the ground too early before reaching the target. If a user fails more than five times on either glove, all the data on both gloves from that user will be excluded. There are ten users failing less than five times, whose average time and average distance are recorded.

Results of a precision test for an index finger are shown in Table 1. The potentiometers of the JAM glove 400 have lower standard deviation values and lower mean errors than the flex sensors of TPM glove 500, which means that JAM glove 400 may be more precise and reliable. However, flex sensors are lighter and easier to integrate into wearable devices in field applications. Therefore, we performed other tests to show that the precision of TPM glove 500 is sufficient for this application.

TABLE 1

| Results of precision test for index finger | | | | | |
| --- | --- | --- | --- | --- | --- |
| | | Glove 400 (FIGS. 4A-4B) | | Glove 500 (FIGS. 5A-5B) | |
| Reliability Test | | Std. | Mean | Std. | Mean |
| Position | Sensor | Dev.(°) | Error (°) | Dev.(°) | Error (°) |
| A | Sensor 1 | 0.4 | 0.3 | 2.4 | 2.0 |
| | Sensor 2 | 0.7 | 0.6 | 8.6 | 6.8 |
| B | Sensor 1 | 0.5 | 0.4 | 1.8 | 1.5 |
| | Sensor 2 | 0.5 | 0.4 | 5.7 | 5.0 |

TPM glove 500 can be used with greater efficiency than JAM glove 400 in both time and distance, suggesting that TPM is overall more intuitive for users. As shown in the plot 1500 of FIG. 15, users tend to consume less time when operating TPM glove 500. This suggests that TPM is more promising in reducing mental demand and effort by the user.

Most of the users, except two of them, can get closer to the goal with TPM glove 500. This suggests that for most users, TPM is better than JAM for performance overall, even though the sensors on TPM glove 500 are less precise. In summary, TPM can be more user-friendly and effective in specifying leg placement for a hexapod robot than JAM.

In some examples, JAM and TPM interface features can be combined in a single glove interface device to take advantage of both precision and efficiency advantages associated with the different approaches. For instance, each finger of the interface could be adapted to include an arrangement of joint angle sensors and flex sensors along the finger to measure joint angle and deflection of the respective fingers. The interface controller of any of the interface devices 400, 500, 600, 800, 1000 described herein can be configured to use both types of sensors, continuously or selectively (e.g., depending on the type of movement or terrain where the robot is located). When both types of data are provided for each finger, the interface controller can be configured to average (or otherwise aggregate) the sensor data from the respective sensors for providing control information to the robot. Alternatively, different fingers of the interface could be implemented using finger configurations and respective sensors from the TPM and JAM user interfaces, such as alternating the types of interfaces devices for respective fingers of the interface device. In some examples, a user could select (e.g., in response to user input instructions provided at a user input device) which type of motion control to implement (e.g., TPM or JAM) based on a given application and/or terrain.

Figure 16:
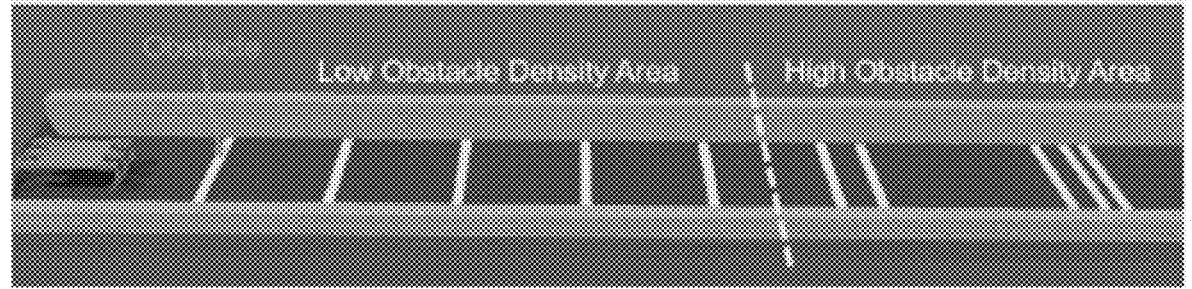
FIG. 16 illustrates an example stimulation environment.
Figure 17:
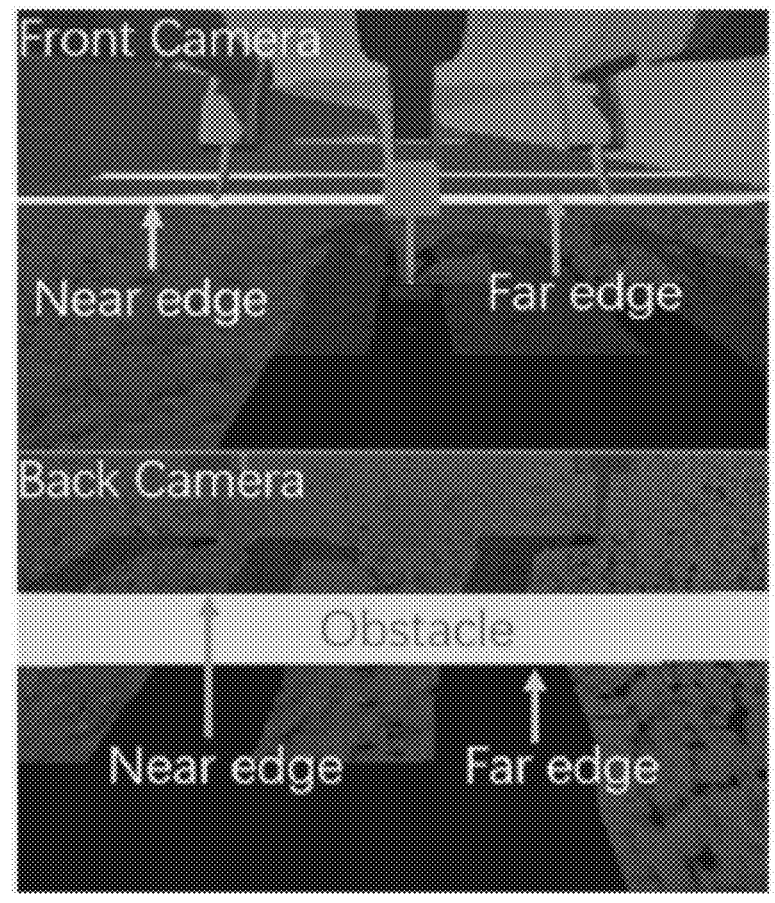
FIG. 17 illustrates front and back camera views of an example robot.

FIGS. 16 and 17 depict part of a Webots simulation and camera display window that can be used for testing the control interface for controlling a robot through a test lane. As shown in the example simulation setup of FIG. 16, the test lane is divided in 2 sections, with five obstacles to avoid in each. The first part has a lower obstacle density while the next part has a higher obstacle density. During manual locomotion control, a camera display windows can be shown to the operator (e.g., in a display device), as shown in front and back view of FIG. 17, so that the operator can observe the environment and the robot movement in a first-person view instead of a global perspective.

In an example, the wearable interface device (e.g., glove interface 400, 500, 600, 800, or 1000) can be configured to implement manual control of a tripod gait for a legged robot, such as shown in FIG. 3. The movement of LF is controlled by the movement of index finger while the other two legs in Tripod1 (LB and RM) follow the movement of LF. The LM is controlled by the middle finger while the other two legs in Tripod2 (RF and RB) follow the movement of LM to keep body balance and avoid slipping on the ground. In some examples, all the foot tips in the same tripod share the same vertical position and horizontal velocity, and the operator only needs to use two fingers to control the robot locomotion. Thus, the operator can focus on locomotion control and environment analysis without being distracted by finger coordination and robot balance. In other examples, more than two fingers (e.g., up to all five digits on a user's hand) could be used in different configurations to control the six legs of the robot in different modes.

As a further example, given fingertip positions $(x_i, y_i)$ $(i=1, 2)$, the corresponding robot foot tip positions $(X_i, Y_i)$ can be defined as the following:

$$\begin{bmatrix} X_1 & Y_1 \\ X_2 & Y_2 \end{bmatrix} = k \begin{bmatrix} x_1 & y_1 \\ x_2 & y \end{bmatrix} + \begin{bmatrix} \delta_{x1} & \delta_{y1} \\ \delta_{x2} & \delta_{y2} \end{bmatrix} \tag{1}$$

where: k is the scaling ratio, a positive and real constant depending on the glove's finger size. k equals to the ratio between the robot leg length and the glove's finger length. $(\delta_{xi}, \delta_{yi})$ form position adjustment vectors to counteract the displacement between the glove and the operator's hand.

The inverse kinematic equations for left side legs can be expressed as follows:

$$\alpha_i = \frac{\pi}{2} - \arctan\frac{X_i}{Y_i} - \arccos\left(\frac{X_i^2 + Y_i^2 + L_1^2 + L_2^2}{2L_1\sqrt{X_i^2 + Y_i^2}}\right) (i = 1, 2) \tag{2}$$

$$\beta_i = \pi - \arccos\left(\frac{L_1^2 + L_2^2 + X_i^2 + Y_i^2}{2L_1 L_2}\right) (i = 1, 2) \tag{3}$$

where: $\alpha_i$ are the angles of the knee joints. $\beta_i$ are the angles of the ankle joints $(X_i, Y_i)$ are the foot tip positions relative to the knee joints. $L_1$ is the length of the robot tibia. $L_2$ is the length of the robot dactyl. Since the right-side legs are bending opposite to the left legs, foot tip positions for the right legs relative to the knee joints in inverse kinematic equations should be $(-X_i, Y_i)$ to keep the right legs moving in the same direction and velocity as the left legs.

During locomotion control, the operator can first predict the obstacle's distance through the obstacle's position in a camera view (or direct line of sight). One step is divided into two phases, stance, and swing. Swing distance is the horizontal distance that the foot tip passes relative to the robot body when it swings in the air. Stance distance is the horizontal distance that the foot tip passes relative to the robot body when it contacts the ground. The step size of the robot is equal to the stance distance. The operator thus can adjust the swing distance and stance distance to avoid stepping on the obstacle. The operator can decrease the swing distance and put the foot tip to a closer position if the obstacle's near edge is close to the predicted footfall position. If the obstacle is close to the robot and the far edge is close to the predicted footfall position, the operator can take a larger step to go over the obstacle.

Example Control Workflows

Figure 18:
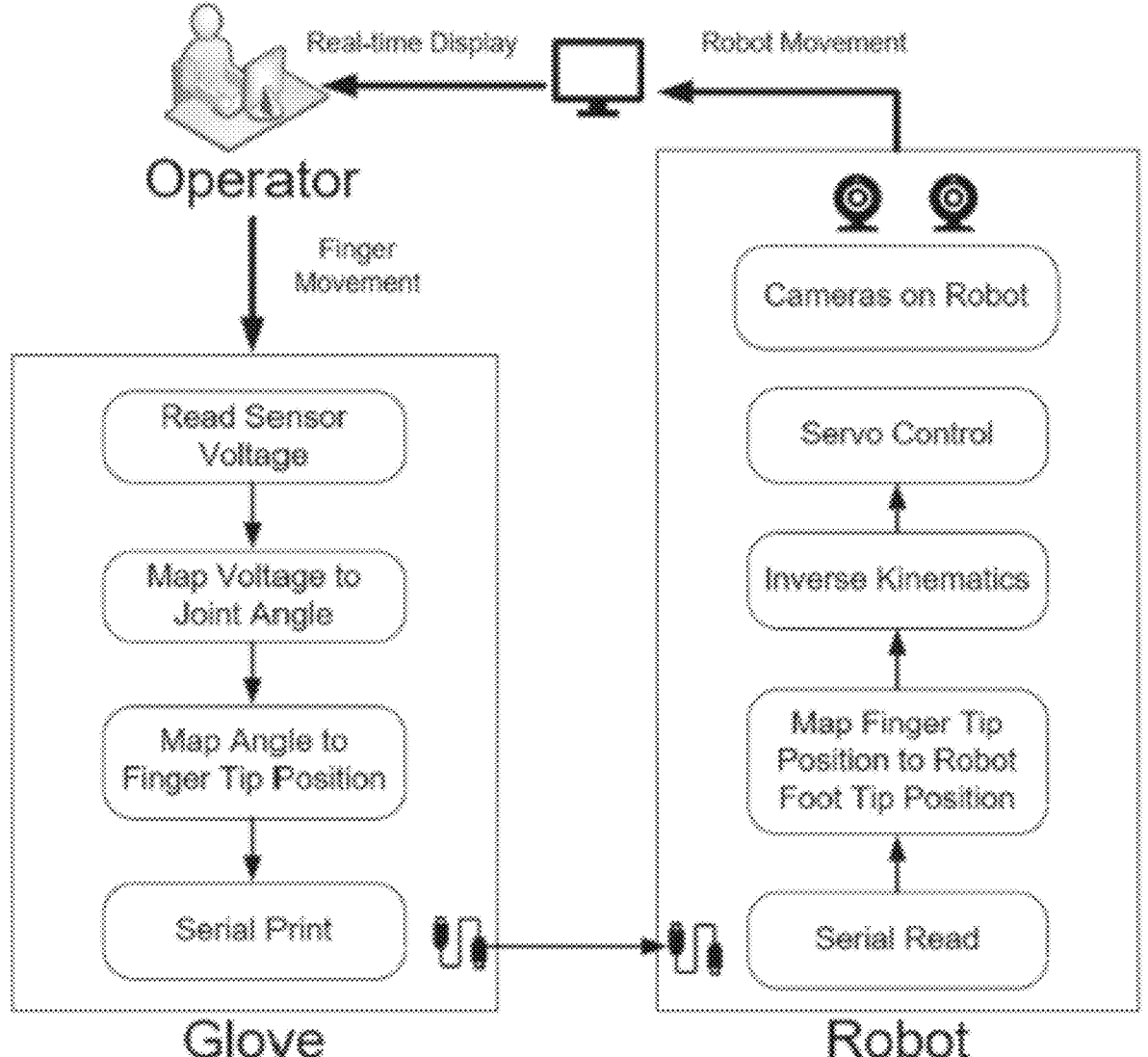
FIG. 18 illustrates an example workflow for a user control interface device.

FIG. 18 illustrates an example workflow diagram for a user control interface device, such as using a user interface device (e.g., glove device 400, 500, 600, 800, 1000) to control a legged robot (e.g., a hexapod). The workflow shows functionality that can be implemented by a controller or other circuitry within each of the user interface device and robot. In the example of FIG. 18, the user interface device and robot can communicate over a communications link, which can include one or more of a physical link and a wireless link. The communications link can be unidirectional or bidirectional. The bidirectional mapping can thus include a first mapping direction from the measured motion to control the motion of the robot, including leg joint angle or torque at the robot, and a second mapping direction from at least one sensor of the robot to the interface device to provide user-perceptible feedback the user.

As an example, the control information communicated through the link from the interface device (e.g., glove device 400, 500, 600, 800, 1000) to control the robot can include motion and/or position data based on sensed motion of one or more fingers of the user. In another example, the control information communicated through the link from the interface device (e.g., glove device 400, 500, 600, 800, 1000) to control the robot can include commands derived from mapping the motion and/or position data (based on sensed motion of one or more fingers of the user) to control joint angle and/or torque applied by actuators on the leg(s) of the robot. In yet another example, the control information communicated through the link from the interface device (e.g., glove device 400, 500, 600, 800, 1000) to control the robot can include motion/position data, robot control commands or any intermediate form of such data that can be received and processed (e.g., filtered, scaled and/or transformed) to control the one or more robot legs.

As a further example with the bidirectional link, the interface controller thus can provide motion data and/or control instructions to the robot through the bidirectional communications link. The robot controller can be configured to receive the measured motion data (representative of user's finger motion) or the control instructions from the interface device through the communications link for controlling one or more legs of the robot based on the control instructions. In some examples, the robot controller receives the motion data and generates the control instructions. The robot controller can also be configured to provide a feedback signal to the interface controller through the communications link, in which the feedback signal is representative of robot motion (which is performed based on the control instructions responsive to the measured finger motion) and/or environmental conditions sensed by one or more sensors at the robot. Additionally, the interface device can be configured to provide user-perceptible feedback at the interface device based on the feedback signal, such as described herein. Also or as an alternative, the robot can provide visual data representative of images captured by one or more cameras carried by the robot and/or provide feedback information based on motion that is implemented responsive to control data received through the communications link. Also, or alternatively, the feedback information can be provided based on a condition(s) sensed by one or more other sensors (e.g., force sensors, temperature sensors, pressure sensors) carried by the robot. The user interface device can provide user-perceptible feedback to the user based on the feedback information provided by the robot. For example, the user-perceptible feedback can include haptic feedback, force feedback, visual graphics on a display, lights, sounds, and/or other information at the interface device to assist the operator in controlling the robot.

In some examples, the interface control device can be operated in a sensing mode, in which sensor data from one or more sensors are received at the interface control device and used to provide feedback. The sensors can be located on the robot, separate from the robot, or both on the robot and separate from the robot. The feedback can be presented on a display or be provided as haptic feedback (e.g., through one or more haptic devices) integrated on the interface control device.

As a further example, a group of fixed gaits is set as for baseline comparison in the experiment groups. Three different step lengths for fixed gaits are tested. For fixed gait, the larger the step length is, the less chance it will have to contact the obstacles because the total contact with ground is reduced. The fixed gaits step lengths are set to be 10 cm, 15 cm and 20 cm to reduce the contact as much as possible. To make sure results are robust to initial conditions, the initial distance from the robot center to the first obstacle's near edge is sampled randomly from 27.5 cm to 57.5 cm for each step length.

To further compare obstacle avoidance, a camera-based autonomous gait is designed. The input visual information can be the same as the camera view provided to the operator. To make the obstacle detection mechanism similar to the human operator, only one camera per side is used to detect the obstacle's distance, rather than doing stereo visual depth perception. When the obstacle is recognized, its near edge and far edge will be located on the camera image, as shown in FIG. 17. The vertical pixel position on the image has a corresponding angle of view. Using the view angle, camera angle and the height of the robot, the obstacle distance can be detected.

$$X_0 = (H_r + Y_c)\tan\left(\Psi - \arctan\frac{(P_v - 2P_0)\tan\frac{\Phi}{2}}{P_H}\right) \quad (4)$$

$X_o$ is the horizontal distance between the obstacle and the center of the robot's body. $H_r$ is the robot body height. $Y_c$ is the vertical position of the camera in the robot's body frame. $\Psi$ is the pitch angle of camera. $P_v$ is the camera's maximum pixel number in the vertical direction. $P_H$ is the camera's maximum pixel number in the horizontal direction. $P_O$ is the obstacle's pixel position in the vertical direction. $\Phi$ is the camera's field of view. The strategy of the autonomous gait is modeled after the manual control strategy. When there is no obstacle in front of the legs, the robot will take steps of fixed swing distance and fixed stance distance. When obstacles are detected in front of the robot leg, the robot will predict the obstacle's position relative to the body center when the swinging foot contacts the ground. The swing distance will be changed to avoid stepping on the obstacles, mimicking strategy in manual control. The swing distance is determined by the predicted obstacle distance.

Figure 19:
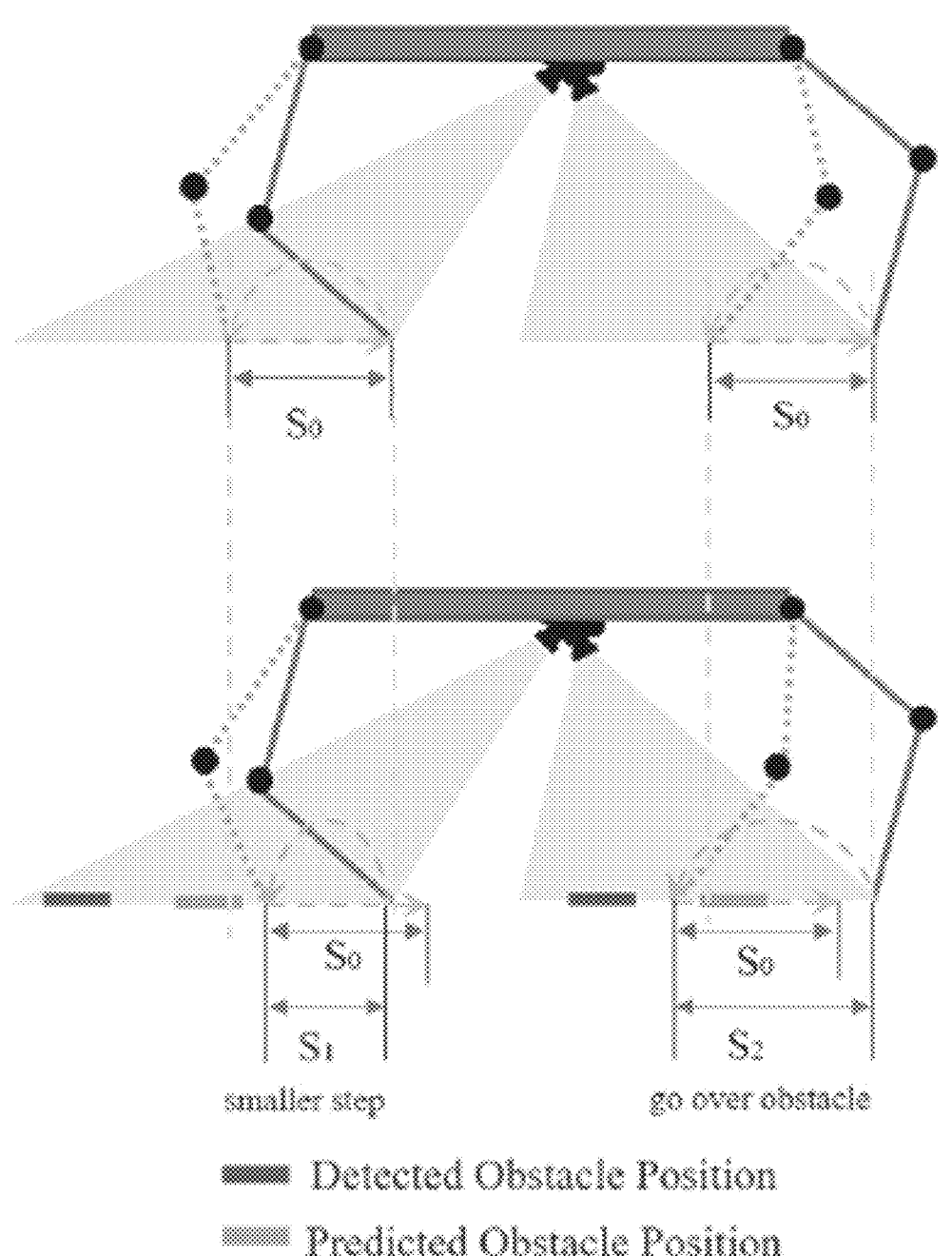
FIG. 19 is a diagram that illustrates an example of a camera-based autonomous obstacle avoidance gait that can be implemented by a robot.

FIG. 19 is a diagram that illustrates an example of camera-based autonomous obstacle avoidance gait that can be utilized in the systems and devices described herein. In the example of FIG. 19, a computer (e.g., control interface) is configured to modify a default swing distance $S_0$ to a smaller swing distance $S_1$ or larger swing distance $S_2$ as needed to avoid obstacles shown in the bottom image. The stance distance (step length) remains the same as the default stance distance $S_0$. The detected obstacle position is the observed position at the beginning of the swing phase, and the predicted obstacle position is where the obstacle will be relative to the robot at the end of the swing phase.

Figure 20:
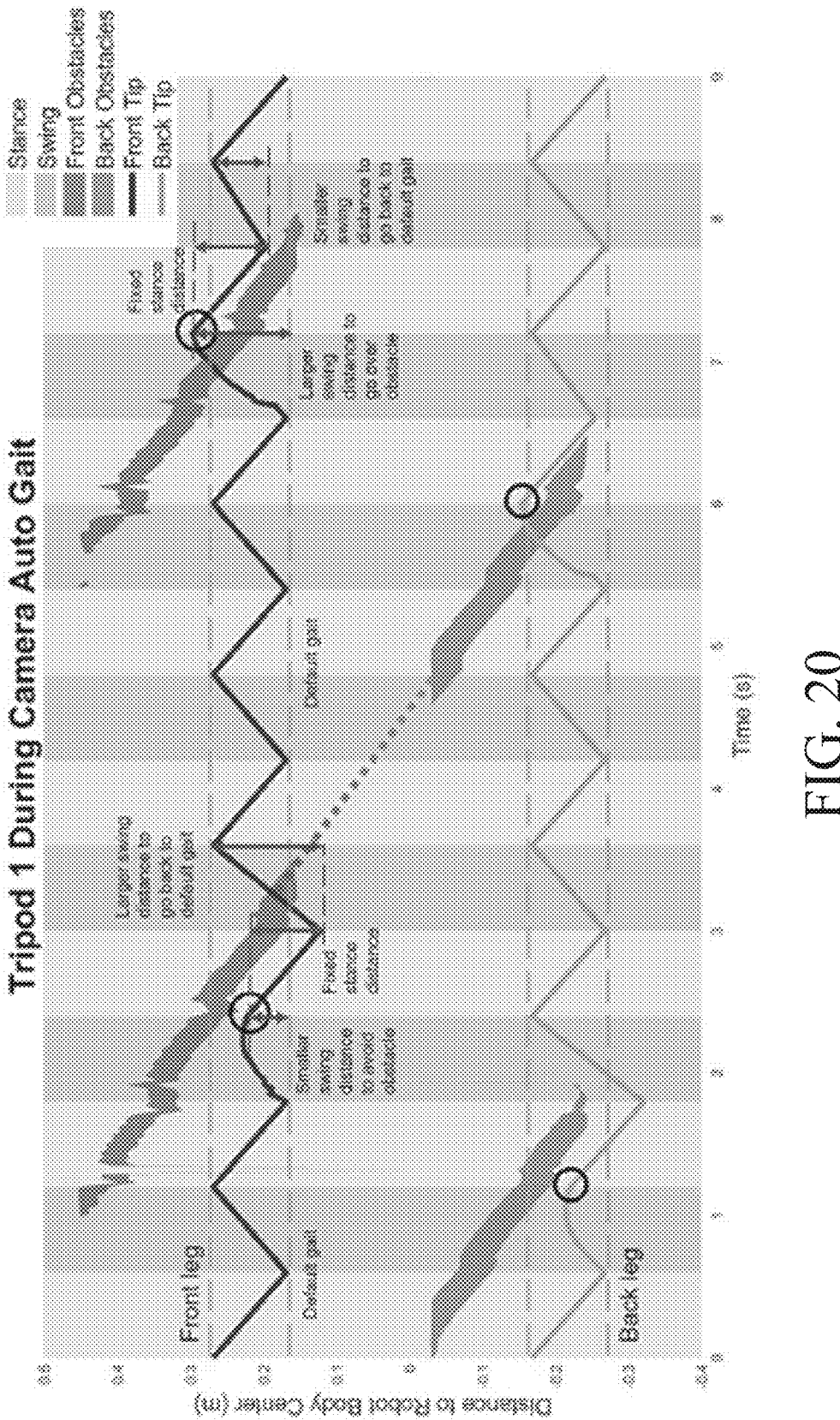
FIG. 20 is a plot showing example trajectories of foot tips relative to the robot body during camera autonomous gait.

FIG. 20 is a plot showing example trajectories of foot tips relative to the robot body during camera autonomous gait. As shown in FIGS. 19 and 20, if the near edge of the obstacle is close to the original contact position, the robot will decrease its swing distance from $S_0$ to $S_1$ to take a smaller step. Determined by the obstacle distance, $S_1$ is smaller than the obstacle distance to keep a safe distance (e.g., about 1 cm to 3 cm) from the obstacle. The subsequent step's support polygon will be shifted backward relative to the body. The robot will go over the obstacle in the next step. If the far edge of the obstacle is close to the original contact position, the robot will increase the swing distance from $S_0$ to $S_2$ to go over the obstacle. The subsequent step's support polygon will be shifted forward relative to the body. $S_2$ is larger than the obstacle distance to keep a safe distance from the obstacle. To keep the velocity constant and avoid slipping, the robot only adjusts the swing distance without changing its stance distance ($S_0$). In other words, the step length of the robot is constant. In the experiment, two different stance distance ($S_0$) for camera-based autonomous gait are tested. Due to the workspace of the robot, the step lengths for autonomous gait can be set to be 8 cm and 10 cm while the maximum swing range for the foot tip is ±10 cm. The step lengths will vary depending on the size of the robot. Example the trajectories of foot tips and obstacles relative to robot body in tripod one (see FIG. 3) during camera autonomous gait are shown in FIG. 20.

Figure 21:
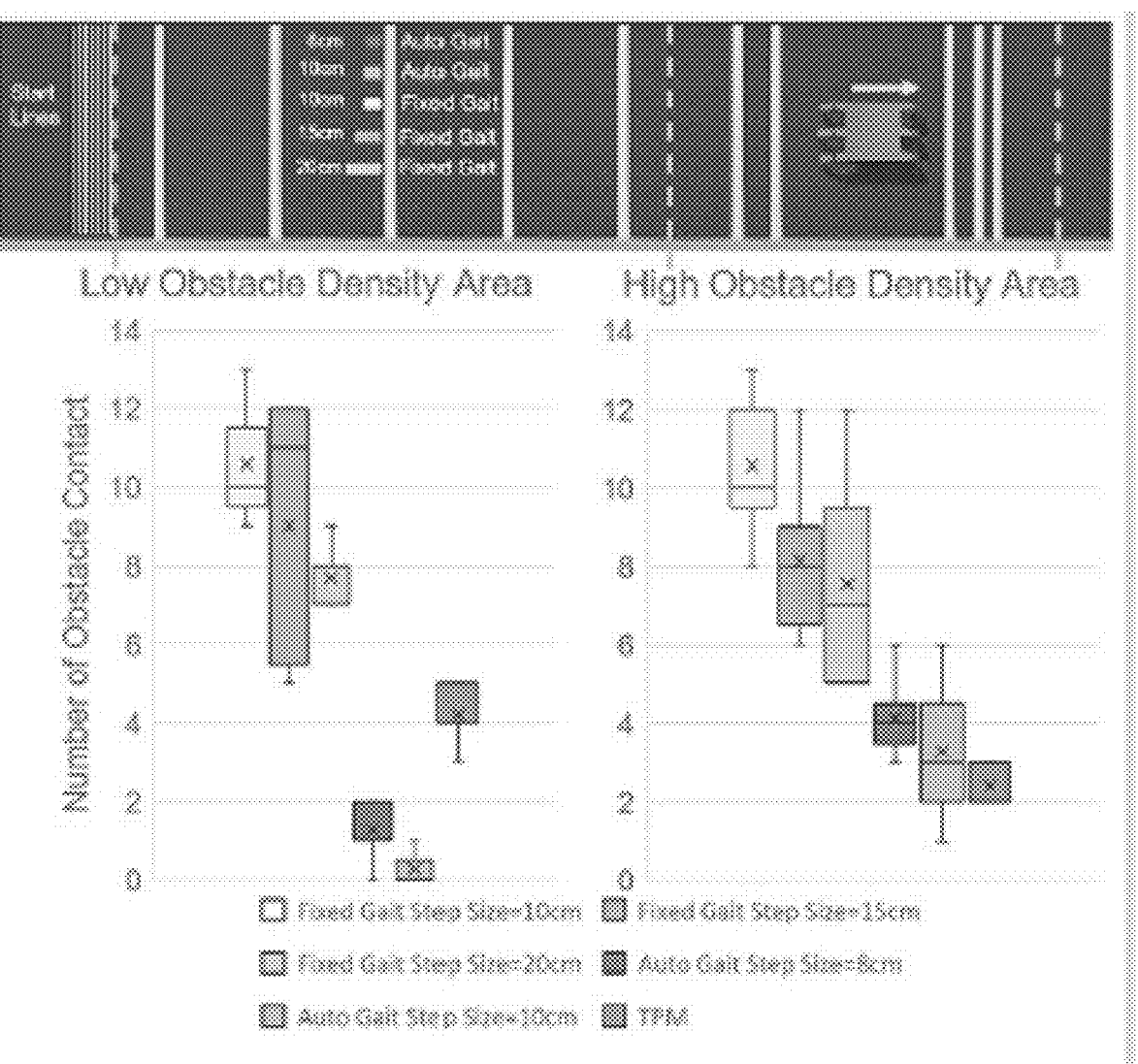
FIG. 21 illustrates an example of results of using different gaits.

By way of comparison, for both low obstacle density area and high obstacle density area, the fixed gaits have the greatest number of obstacle contacts (NOC), as shown in FIG. 21. The average NOC, marked by the cross marker in the boxplot, decreases when step size is increased. This is expected because the fixed gaits are "blind" to obstacles and larger steps impact the ground less often.

The results of camera-based autonomous gait are much better than the results of fixed gait, especially in the Low Obstacle Density Area. Compared with the 10 cm fixed gait, the average NOC is reduced by 97% in the Low Obstacle Density Area. While ideally, we want to eliminate all obstacle contacts (e.g., NOC=0), impacts with the ground cause perturbations in pitch angle which can lead to errors in observed obstacle distance, as shown in FIG. 20 from 2 s to 3 s. To avoid contact resulting from distance error, tolerances are added to the autonomous gait, represented by the radius of the circles in FIG. 20. The user interface described herein (e.g., gloves 400, 500, 600, 800, 1000) can also include an inertial measurement unit (IMU), vibration dampers or be further configured to perform signal filtering to help reduce the NOC.

As a further example, the performance of autonomous gait in the High Obstacle Density Area is not as good as that in Low Obstacle Density Area. Take 10 cm camera-based autonomous gait as an example, the average of NOC increases to three while the maximum NOC increases to 6. The increase in NOC is mainly caused by the misjudgment when there are multiple obstacles in one camera view. In some examples, the controller is designed to detect only the distance of the nearest obstacle, which leads to possible contact with the following obstacles along the robot's path. In other examples, the controller can be configured to have additional layers of control to handle these situations and implement a more complex autonomous gait. In view of the foregoing, the TPM HHCI (e.g., interface devices 500, 600, 800 and 1000) seems an effective mapping approach to avoid obstacles.

This disclosure provides user interface devices (e.g., devices 400, 500, 600, 800 and 1000) and related methods for controlling legged and other locomotive robots using hand-to-robot mapping to specify leg placement and/or other robot functions (see, e.g., FIG. 1). In one example, the glove interface device can provide an intuitive approach in speci-fying leg placement (see, e.g., FIGS. 6A and B), such as for use in sideways walking (FIG. 16) to walk along a straight lane while avoiding bar-like obstacles. In other examples, the controller of the interface device can be configured to implement an autonomous gait in combination with manual control to provide effective step size adjustments to avoid obstacles. Manual control may further have advantages over camera-based autonomous gait when there are multiple obstacles on one side (see, e.g., high obstacle density area in FIG. 21). For instance, in a situation in which there is no autonomous gait available, a manual control scheme is likely to be comparable or more accurate in the sagittal plane.

The difference in manual control performance between the low obstacle density area and the high obstacle density area (see, e.g., FIG. 21) mainly results from the distribution of the obstacles (see, e.g., FIG. 16). In the low obstacle density area, the obstacle spacing is close to the body length. Thus, there are situations in which both monitors have obstacles displayed. When handling multiple obstacles on both sides, the human operator must focus on both of the camera monitors, trying to go over obstacles on one side and avoid touching obstacles on the other side. To avoid both obstacles, stance legs (controlled by one finger) and swing legs (controlled by the other finger) must be coordinated. During long-distance walking while focusing on two moni-tors at the same time, the operator's attention cannot always be highly concentrated. Inattention can lead to mistakes in judgment or operation and increases the NOC in glove controlled locomotion. In contrast, in the high obstacle density area, multiple obstacles only appear on the same side of the robot. Thus, the operator only needs to look at one camera monitor and focus on the control of the legs on that side. With reduced workload and less distraction, the opera-tor can have more accurate control in obstacle avoidance.

Thus, as expected interface devices 400, 500, 600, 800 and 1000 for tripod gaits can facilitate placement of one leg at a time. Thus, for an application such as munitions response, in which a robot might be exploring an area with infrequent objects of interest until the target object of interest is found, the autonomous gait might be used for much of the locomotion, and then as the robot gets closer the user can switch to manual controls using one an interface device (e.g., devices 400, 500, 600, 800 and 1000) as described herein for manual control.

Once at the object of interest, the robot would be posi-tioned such that rear leg placement is not as critical and operator can focus on how actions affect front legs.

In addition, more adjustments and controls could be added. As one example, the robot can include one or more cameras and employ computer visualization methods such as to display on the control interface (or another display) a visualization in which the fingers of the control interface are superimposed over respective legs of the robot. The use of additional fingers for different legs, or switchable modes can further be implemented in the interface control devices (e.g., devices 400, 500, 600, 800 and 1000) to improve perfor-mance.

While the user interface devices are described herein in many examples (e.g., FIGS. 4A-4B, 5A-5B, 6, 8, and 10-12) with respect to controlling one or more appendages of a legged robot, the user interface devices described herein are not limited to controlling legged robots. In other examples, the user interface device described herein can be used to control other types of locomotion in terrestrial, aquatic and/or aerial environments, including legged locomotion (by controlling one or more appendages), limbless locomotion (e.g., by controlling the body to propel the structure) and rolling locomotion (e.g., by controlling rotation of one more rotating bodies). Also, or as an alternative, the control interface (e.g., interface device 400, 500, 600, 800, 1000) can also be configured to implement steering control, pro-vide haptic feedback and/or provide force feedback (or other feedback) to the user through the interface device.

Steering is used to control the direction of a robot in a three-dimensional environment. Adduction/abduction at the MCP of the interface device (e.g., device 400, 500, 600, 800, or 1000) be determined with additional sensors. For example, the controller can be configured to determine hip angle of the robot using an approach similar to that disclosed herein for other joints. Alternatively, because frequent adduction and abduction movement can be uncomfortable, a user interface device can include one or more sensors adapted to measure rotation of a user's wrist, and the controller can be configured to use rotation at the user's wrist to control steering direction. In yet another example, a joystick or other input device can be included to implement additional steering control functions of the robot, such as described herein (see, e.g., FIGS. 6 and 10).

The control interface (e.g., interface devices 400, 500, 600, 800 and 1000) can include one more other input devices to implement one or more control functions of the robot. Examples of such other input devices include a multi-directional joystick, pushbuttons, slides, rotation of knobs (e.g., potentiometers), touchscreen interface controls, and the like. The control interface can be configured to map signals received from each such input device to predeter-mined robot control functions (e.g., actuators or the like). Also, or as an alternative, the mapping between the robot functions can be programmable, such as in response to user input instructions defining which function(s) are to be per-formed responsive to control signals received from the respective input devices.

In one example, the control interface only provides vision feedback to the operator (e.g., without haptic feedback) based on images acquired by one or more cameras carried by the robot. Visual feedback can be improved to manage attention following the principles of interaction efficiency. Alternatively, wearable Virtual Reality or augmented reality devices could be used (e.g., coupled to the control interface through a communications link). In other examples, haptic feedback from the robot can be applied to the wearable user interface device. In such examples, the user may be able to "feel their way" through environments with limited vision or feel objects, such as including objects buried in sand or in fluid having particulates or otherwise having degraded visibility.

In yet another example, the glove interface device (e.g., device 400, 500, 600, 800, 1000) can be implemented as a dorsal-based glove configured to provide force feedback through one or more actuators (e.g., at respective joints or other positions). The glove interface device can be configured to provide force feedback to the user's hand in two or three spatial dimensions based on sensor feedback provided to the interface device through the communications link. For example, the glove interface device is configured to provide force feedback in multiple directions for one or more fingers, such as both axial force (e.g., along fingertip) and radial force (e.g., normal to the fingertip). This type of 3D force feedback has advantages over traditional haptic feedback gloves, which tend to be limited in workspace (e.g., palm- or digit-based gloves), are ground-based (and thus not wearable) or have only flexion-extension feedback rather than the full 3D feedback a human fingertip experiences.

As described herein, a user interface device (e.g., device 400, 500, 600, 800, 1000) can include sensors for two fingers to enable control of the two tripods of walking gait. Accordingly, the devices and methods herein can be configured to switch between modes for walking (in which all legs move) and in-place motions (in which individual legs move, but stance legs stay planted). For example, the user interface device can include a mode switch device (or other user interface element) configured to switch between the walking mode and one or more other motion modes in response to a user input. As further described herein, the control interface device and methods can be configured to implement a hybrid of manual and autonomous (e.g., artificial intelligence) control, allowing the user to correct autonomous walking behavior in real time. Furthermore, the user's inputs may be able to be compared with programmed gaits to enable gaits to adapt to user preferences.

Because the user interface devices and methods described herein only require finger motions, the effort to control a robot will be less and the mental demand will be comparable to (or even less than) that of using a joystick. As human-robot interfaces are being developed, wearable and intuitive smart devices can be important because they change the robot from a tool to be wielded to an extension of the user's own body. The devices and methods disclosed herein can take advantage of similarity between human hand anatomy and robot design, to create a working interface. The devices and methods described herein thus can enable users without extensive robotics training to quickly learn to control robots as needed. In challenging and distracting environments, such as underwater or field work, lightweight one-hand interfaces are likely to be especially valuable.

As used herein, the term "and/or" can include any and all combinations of one or more of the associated listed items. As used herein, phrases and/or drawing labels such as "X-Y", "between X and Y" and "between about X and Y" can be interpreted to include X and Y.

It will be understood that when an element is referred to as being "on," "attached" to, "connected" to, "coupled" with, "contacting", "adjacent", etc., another element, it can be directly on, attached to, connected to, coupled with, contacting, or adjacent the other element or one or more intervening elements may also be present. For example, if device A generates a signal to control device B to perform an action, then: (a) in a first example, device A is coupled to device B; or (b) in a second example, device A is coupled to device B through intervening component C if intervening component C does not alter the functional relationship between device A and device B, so device B is controlled by device A via the control signal generated by device A. In contrast, if an element is referred to as being, for example, "directly on," "directly attached" to, "directly connected" to, "directly coupled" with, "directly contacting", or "directly adjacent" another element, there are no intervening elements present.

Spatially relative terms, such as "under," "below," "lower," "over," "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

Also, a device or component that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device.

The recitation "based on" means "based at least in part on." Therefore, if X is based on Y, X may be a function of Y and any number of other factors.

From the above description of the invention, those skilled in the art will perceive improvements, changes, and modifications. Such improvements, changes, and modifications within the skill of the art are intended to be covered by the appended claims. All references, publications, and patents cited in the present application are herein incorporated by reference in their entirety.

What is claimed is:

1. A robot system, comprising
a wearable human-machine interface device comprising:
a base;
a finger extending longitudinally from the base and including first and second finger segments, in which a proximal end of the first finger segment is coupled to the base, a proximal end of the second finger segment is coupled to a distal end of the first finger segment by a joint, and the joint is adapted to enable movement of the second finger segment relative to the first finger segment;
a sensor coupled to the finger and configured to provide a sensor signal representative of a position and/or movement of the second finger segment relative to the first finger segment; and
an interface controller configured to provide a control signal representative of a flexion of the finger and/or a position of a distal tip of the finger based on the sensor signal; and a legged robot coupled to the interface device through a communications link between the robot and the interface device, the robot comprising:

a body;

a plurality of legs, in which each of the legs of the legged robot extends from the body and terminates in a respective foot at a distal end of the respective leg, and at least one of the legs includes a leg joint having a respective robot joint angle;

an actuator coupled to the at least one of the legs and configured to move the at least one of the legs relative to the body; and a robot controller configured to determine a foot position for the respective foot of the at least one of the legs based on the control signal received through the communications link, in which the control signal includes position data representative of a position of the distal tip of the finger, the robot controller is configured to determine a corresponding robot joint angle for the at least one of the legs based on inverse kinematics applied to the foot position, and the robot controller is configured to control the actuator based on the corresponding robot joint angle.

2. The interface device of claim 1, wherein the interface controller is configured to determine a position of the distal tip of the finger based on the sensor signal.

3. The interface device of claim 2, wherein the interface controller is further configured to determine a joint angle based on the sensor signal and compute the position of the distal tip based on forward kinematics applied to the joint angle.

4. The robot system of claim 1, wherein the sensor comprises a joint angle sensor configured to provide a sensor signal having a value representative of a joint angle between the first and second finger segments.

5. The robot system of claim 4, wherein the joint angle sensor comprises a linear rotary potentiometer, and wherein the joint is a first rotating joint, the sensor is a first sensor configured to provide a first sensor signal representative of an angular position and/or movement of between the first and second finger segments, and the interface device further comprises:

a second rotating joint between the proximal end of the first finger segment and the base; and a second sensor configured to provide a second sensor signal representative of an angular position and/or movement between the first finger segment and the base.

6. The robot system of claim 5, further comprising:

a finger attachment support coupled to the second finger segment and configured to attach the second finger segment with respect to a distal phalange of a user;

a base attachment support configured to attach the base with respect to a hand and/or wrist of the user;

a third rotating joint between the finger attachment support and the second finger segment; and a third sensor coupled to the finger attachment support or joint, in which the third sensor is configured to provide a third sensor signal representative of at least one of angular position and/or movement of the third rotating joint and force between the distal phalange of the user and the finger attachment support.

7. The robot system of claim 1, wherein the sensor of the interface device comprises a joint angle sensor configured to provide a joint angle sensor signal having a value representative of a finger joint angle between the first and second finger segments, and wherein the robot controller is configured to determine the corresponding robot joint angle of at least some of the legs based on the control signal, which is received through the communications link and includes position data representative of the finger joint angle.

8. The robot system of claim 1, further comprising a user input device on or coupled to the base and configured to provide a user input signal responsive to a user input, the interface controller configured to provide the control signal to include a command to control a function of the robot based on the user input signal.

9. The robot system of claim 1, wherein the interface device further comprises:

a base attachment support on the base and adapted to attach the base with respect to a hand and/or wrist of the user; and a joystick user input device extending from the base or the base attachment support, the joystick user input device configured to provide a joystick control signal based on movement of the joystick, wherein the legged robot is configured to perform an automated gait in a direction based on the joystick control signal.

10. A wearable human-machine interface device comprising:

a base;

a first finger extending longitudinally from the base and including first and second finger segments, in which a proximal end of the first finger segment is coupled to the base, a proximal end of the second finger segment is coupled to a distal end of the first finger segment by a joint, and the joint is adapted to enable movement of the second finger segment relative to the first finger segment;

a first sensor coupled to the finger and configured to provide a first sensor signal representative of a position and/or movement of the second finger segment relative to the first finger segment;

a second finger extending longitudinally from the base and including third and fourth finger segments, in which a proximal end of the third finger segment is coupled to the base, a proximal end of the fourth finger segment is coupled to a distal end of the third finger segment by a second joint, and the second joint is adapted to enable movement of the fourth finger segment relative to the third finger segment; and a second sensor coupled to the finger and configured to provide a second sensor signal representative of a position and/or movement of the fourth finger segment relative to the third finger segment; and an interface controller configured to provide a first control signal representative of a flexion of the first finger and/or a position of a distal tip of the first finger based on the first sensor signal, wherein the interface controller is configured to provide a second control signal representative of a flexion of the second finger and/or a position of a distal tip of the second finger based on the second sensor signal.

11. The interface device of claim 10, wherein the first sensor is a flex sensor that extends along a length of the respective finger and over the joint, the flex sensor is configured to provide the sensor signal representative of bending or deflection of the flex sensor responsive to the movement of the second finger segment relative to the first finger segment.

12. The interface device of claim 10, further comprising:

a finger attachment support coupled to the second finger segment and adapted to attach the second finger segment with respect to a distal phalange of a user; and a base attachment support on the base and adapted to attach the base with respect to a hand and/or wrist of the user.

13. The interface device of claim 10, further comprising:

a base attachment support on the base and adapted to attach the base with respect to a hand and/or wrist of the user; and a joystick user input device extending from the base or the base attachment support, the joystick user input device configured to provide a joystick control signal based on movement of the joystick.

14. A robot system, comprising:

a wearable human-machine interface device comprising:

a base;

a finger extending longitudinally from the base and including first and second finger segments, in which a proximal end of the first finger segment is coupled to the base, a proximal end of the second finger segment is coupled to a distal end of the first finger segment by a joint, and the joint is adapted to enable movement of the second finger segment relative to the first finger segment;

a sensor coupled to the finger and configured to provide a sensor signal representative of a position and/or movement of the second finger segment relative to the first finger segment; and an interface controller configured to provide a control signal representative of a flexion of the finger and/or a position of a distal tip of the finger based on the sensor signal;

a locomotive robot coupled to the interface device through a communications link between the robot and the interface device, the robot comprising:

a body;

a limb extending from the body;

an actuator coupled to the limb and configured to move the limb relative to the body to cause locomotion of the robot on or through a medium;

a robot sensor configured to provide a robot sensor signal representative of a sensed condition associated with the robot; and a robot controller configured to control the actuator to move the limb based on the control signal, which is received through the communications link, wherein:

the robot controller is configured to provide a feedback signal to the interface controller through the communications link, in which the feedback signal is based on robot sensor signal, and the interface controller is configured to provide user-perceptible feedback at the interface device based on the feedback signal.

15. The robot system of claim 14, wherein the user-perceptible feedback comprises haptic feedback.

16. A wearable human-machine interface device comprising:

a base;

a first finger extending longitudinally from the base and including first and second finger segments, in which a proximal end of the first finger segment is coupled to the base, a proximal end of the second finger segment is coupled to a distal end of the first finger segment by a joint, and the joint is adapted to enable movement of the second finger segment relative to the first finger segment;

a first flex sensor that extends along a length of the finger and over the joint and configured to provide a first sensor signal representative of bending or deflection of the flex sensor responsive to the movement of the second finger segment relative to the first finger segment;

a second finger extending longitudinally from the base and including third and fourth finger segments, in which a proximal end of the third finger segment is coupled to the base, a proximal end of the fourth finger segment is coupled to a distal end of the third finger segment by a second joint, and the second joint is adapted to enable movement of the fourth finger segment relative to the third finger segment;

a second flex sensor extending along a length of the second finger and over the joint, the second flex sensor being configured to provide a second sensor signal representative of bending or deflection of the flex sensor responsive to movement of the fourth finger segment relative to the third finger segment; and an interface controller configured to provide a first control signal representative of a flexion of the first finger and/or a position of a distal tip of the first finger based on the first sensor signal, and the interface controller is configured to provide a second control signal representative of a flexion of the second finger and/or a position of a distal tip of the second finger based on the second sensor signal.

* * * * *